United States Patent
Hayashi et al.

(10) Patent No.: US 6,879,413 B1
(45) Date of Patent: Apr. 12, 2005

(54) CARRIAGE DRIVING MECHANISM IN IMAGE PROCESSOR

(75) Inventors: Eiichi Hayashi, Ohmiya (JP); Yuichi Kawanabe, Ohmiya (JP)

(73) Assignee: Fuji Photo Film Optical Co., Ltd. (JP)

( * ) Notice: Subject to any disclaimer, the term of this patent is extended or adjusted under 35 U.S.C. 154(b) by 930 days.

(21) Appl. No.: 09/664,394

(22) Filed: Sep. 19, 2000

(30) Foreign Application Priority Data

Sep. 20, 1999 (JP) .......................................... 11-265407
Sep. 29, 1999 (JP) .......................................... 11-275838
Sep. 30, 1999 (JP) .......................................... 11-279206

(51) Int. Cl.$^7$ ................................................ H04N 1/04
(52) U.S. Cl. ...................................... 358/474; 358/497
(58) Field of Search ............................... 358/497, 474, 358/494, 471, 406, 504, 505, 483, 514, 513, 512, 409; 382/312, 318, 319; 399/211, 212, 206; 355/75; 250/208.1, 234–236

(56) References Cited

U.S. PATENT DOCUMENTS

| | | | |
|---|---|---|---|
| 4,367,945 A | | 1/1983 | Abe ............................ 355/51 |
| 4,634,261 A | | 1/1987 | Nagoshi ..................... 399/212 |
| 4,870,502 A | * | 9/1989 | Dreinhoff et al. ........... 358/474 |
| 4,931,836 A | | 6/1990 | Matsushita et al. ......... 399/212 |
| 4,989,041 A | * | 1/1991 | Miura et al. ................ 399/212 |
| 5,194,898 A | * | 3/1993 | Costrop et al. ............. 358/497 |
| 5,260,811 A | | 11/1993 | Morikawa ................... 358/474 |
| 5,570,206 A | | 10/1996 | Yoshinaga .................. 358/497 |
| 5,717,503 A | | 2/1998 | Chien ......................... 358/475 |
| 5,760,924 A | | 6/1998 | Takahara et al. ............ 358/474 |
| 5,999,277 A | * | 12/1999 | Tsai ............................ 358/497 |
| 6,067,174 A | | 5/2000 | Hayashi ...................... 358/497 |
| 6,072,602 A | * | 6/2000 | Sun et al. ................... 358/497 |
| 6,091,517 A | | 7/2000 | Hayashi ...................... 358/497 |
| 6,108,505 A | | 8/2000 | Hayashi ...................... 399/206 |
| 6,144,465 A | | 11/2000 | Hayashi ...................... 358/474 |
| 6,266,164 B1 | * | 7/2001 | Chiang ........................ 358/497 |
| 6,442,365 B1 | * | 8/2002 | Schlueter, Jr. et al. ...... 399/328 |

OTHER PUBLICATIONS

U.S. Appl. No. 09/038,735 entitled Guiding Mechanism for Slidable Movement of a Carrier in an Image Processor=U.S. Pat. No. 6,144,465.
U.S. Appl. No. 09/310,392 entitled Take–Up Pulley in an Image Processor=U.S. Pat. No. 6,220,106.
U.S. Appl. No. 09/310,437 entitled Driving Shaft Construction in an Image Processor.

* cited by examiner

*Primary Examiner*—Cheukfan Lee
(74) *Attorney, Agent, or Firm*—Price, Heneveld, Cooper, DeWitt & Litton

(57) ABSTRACT

A carriage driving mechanism to prevent the carriage adapted to travel as a predetermined wire is taken up from floating and remaining in such floating position due to an unexpected force exerted on said carriage under a tensile force. A carriage support extending from transversely opposite ends is provided with contact arms extending upward, respectively, to come in contact with a top plate of a housing to restrict the carriage from further floating off. Legs directly placed on guide tracks of the housing to support the carriages on the guide tracks and are formed with oil sumps filled with suitable lubricant such as grease. At least one of the legs is formed to adjust a height of this one leg to level the carriage.

31 Claims, 25 Drawing Sheets

(a)

(b)

CARRIAGE DRIVING MECHANISM IN IMAGE PROCESSOR

BACKGROUND OF THE INVENTION

1. Field of the Invention

This invention relates to an image processor adapted to irradiate an original with light rays emitted from a light source and to read image information formed on the original from light rays reflected on the original and more particularly to a driving mechanism ensuring carriages to be smoothly and stably moved for scanning of the original.

2. Description of the Related Art

In the image processor of stationary original type, a light source lamp is moved relatively to an original placed on platen glass to scan the original so as to pick up image information line to line. FIG. 23 of the accompanying drawings is a perspective view schematically showing a construction of such image processor 1. In a housing 2 of the image processor 1, transversely opposite walls 2a, 2a have their inner surfaces stepped to define guide tracks 2b, 2b on which a full-rate carriage 3 and a half-rate carriage 4 are placed. These carriages 3, 4 are guided on said tracks 2b, 2b to move longitudinally of the housing 2. The housing 2 is provided on its upper surface with a platen glass (not shown) on which the original is placed. The full-rate carriage 3 carries a fluorescent lamp 5 serving as a light source lamp for irradiation of the original. A bottom plate 2c of the housing 2 is provided at its appropriate locations with an image-focusing lens 6 and photoelectric converter means 7 such as a CCD (Charge Coupled Device).

The full-rate carriage 3 additionally carries a first reflector (not shown) and the half-rate carriage 4 carries a second reflector and a third reflector (both not shown). The light rays emitted from the fluorescent lamp 5 and reflected on the original are successively reflected on said first reflector, second reflector and third reflector, then transmitted through said image focusing lens 6 and enter the photoelectric converting means 7. Via these first, second and third reflectors, and an optical path extending from the original to the photoelectric converting means 7 is established. In view of a fact that an entire area of the original must be irradiated in order to acquire the image information from the original, said full-rate carriage 3 is adapted to be movable over an entire area of the platen glass. Said optical path extending from the original to the photoelectric converting means 7 must maintain a constant length as said full-rate carriage 3 is moved. To ensure this, said half-rate carriage 4 is adapted to move in synchronization with the full-rate carriage 3 so that a movable range of said half-rate carriage 4 may substantially correspond to ½ of a movable range of said full-rate carriage 3.

FIG. 24 is a perspective view schematically showing a driving mechanism synchronously driving these carriages 3, 4. A driving shaft 8 having its axis which extends orthogonally to a scanning direction of the carriages 3, 4 is rotatably supported by the housing 2 in the vicinity of its longitudinal one end and this driving shaft 8 is provided at its longitudinally middle position with a driven pulley 9 fixed thereon. A loop of driving belt 12 is draped on said driven pulley 9 and a driving pulley 11 fixed on an output shaft of a motor 10 mounted on the bottom plate 2c of the housing 2. The driving shaft 8 is provided at each of its longitudinally opposite ends with a take-up pulley 13 fixed thereon. The drive mechanism further includes a predetermined length of wire 14 (referred to hereafter simply as "wire 14") and an intermediate length of the wire 14 is wound around this pulley 13 by an appropriate number of turns. The half-rate carriage 4 carries on each of its end surfaces a pair of guide pulleys 15, 16 arranged side by side and being rotatable around their axes extending orthogonally to said scanning direction. Axial positions of these guide pulleys 15, 16 are different from each other so that their outer peripheral surfaces may overlap each other as will be apparent from FIG. 25. The end of the housing 2 opposed to said end provided with said drive shaft 8 carries a guide pulley 17 being rotatable around its axis extending orthogonally to said scanning direction. The sidewall 2a of the housing 2 is provided at an appropriate position with a bracket 2d. As will be obviously understood, these take-up pulley 13, wire 14, guide pulleys 15, 16, 17 and bracket 2d are pairly provided within the housing 2 so that each pair of members may be opposed to each other and define a field to be scanned therebetween.

With one end fixed to said bracket 2d, said wire 14 is draped around said guide pulley 15 positioned at a distance from the full-rate carriage 3 longer than said guide pulley 16 is, and said wire 14 is operatively associated with said full-rate carriage 3 by means 18 for this purpose. Then said wire 14 is successively draped about said guide pulley 13, said guide pulley 17 and said guide pulley 16. The other end of said wire 14 is anchored to sidewall of the housing 2 by means of a tension spring 19.

It is important that these carriages 3, 4 are smoothly movable. To meet this requirement, said carriages 3, 4 are supported on said guide tracks 2b via four legs, respectively. These legs are made of synthetic resin or the like presenting a small sliding friction relative to said guide tracks 2b made of metallic material. To assure a desired slidability of the carriages 3, 4, the contact points between said legs and said guide tracks 2b are applied with lubricant.

The photoelectric converter device 7 cannot output a desired image data unless the light rays reflected on the original reliably and stably enter the image-focusing lens 6. To achieve this, said carriages 3, 4 must be stably moved at a high accuracy. Particularly, a recent digitalization of the image processor has reduced the luminous flux width for reading the image on the original and correspondingly improved stability as well as the accuracy of the carriages' movement have been required. Said arrangement that the carriages 3, 4 are supported on said guide tracks 2b via four legs, respectively, has been developed to meet such requirement. For the conventional image processor still not digitalized, three legs have been sufficiently effective to support the carriages on the guide tracks since the luminous flux width has been relatively large.

The driving mechanism as has been described above in reference with FIG. 24 advantageously contributes to miniaturization of the image processor by arranging the half-rate carriage 4 to support said guide pulleys 15, 16 so that these guide pulleys 15, 16 overlap to each other as seen in FIG. 25 and thereby reducing a width of said half-rate carriage 4 as measured in the scanning direction. However, said wire 14 is draped on the guide pulleys 15, 16 so as to bridge these two guide pulleys and such arrangement may cause a problem will be described. In fact, said wire 14 is appropriately tensioned under a tensile force of the tension spring 19 while the half-rate carriage 4 is placed on said guide tracks 2b. Therefore, if unexpected force is exerted upon the image processor 1 during its transport or during its operation of scanning, the half-rate carriage 4 may jump up and thereupon the tensile force of said wire 14 may draw said guide pulleys 15, 16. Consequently, a new tensioned condition may be established with the half-rate carriage 4 remaining tilt and said half-rate carriage 4 cannot restore its normal position for its scanning operation. Once the half-rate carriage 4 has been retained in this jumped up position, no image data can be read from the original even if the operation of scanning is tried.

In view of the problem as has been described above, it is a first object of this invention to provide a carriage driving mechanism in the image processor improved so that, even if the half-rate carriage jumps up due to unexpected force exerted upon the image processor, said half-rate carriage is not retained in a tilted position but can restore its normal position for scanning operation.

The carriage driving mechanism of prior art has usually been accompanied with an apprehension that said lubricant applied on the leg decreases as the image processor is operated for a long period. When the lubricant decreases to a certain degree, an adequate lubricating function can be no more expected until an extraordinary noise may be generated or a smooth movement of the carriage for scanning may be obstructed. Eventually, pick-up of the accurate image data may become difficult or even impossible. In addition, once the carriage has been obstructed from its smooth movement, the carriage may readily jump up during its movement for scanning operation.

Taking account of the problem as has described just above, it is a second object of this invention to provide a carriage driving mechanism in the image processor improved so that a sufficient lubricating effect to ensure a smooth movement of the carriage is maintained even if the image processor continues to be operated for a long period.

With the arrangement that the carriage is supported on the guide tracks via four legs as has previously been described, if a precision at which said legs have been worked and/or a precision at which said legs have been mounted on the carriage is insufficient, a flatness of the carriage will be correspondingly deteriorated and the carriage will tilt. Said first-third reflectors also tilt as said carriage tilts, resulting in the reflected light rays cannot stably enter the photoelectric converter device, leading to an inaccurate image data and blurred image printed on the basis of said accurate image data. If the carriage thus tilted continues to travel along the guide track, the tensile force of said wire 14 will no more evenly act on the guide pulleys and, as a result, the carriage will readily jump up.

In view of this problem, it is a third object of this invention to provide a carriage driving mechanism in the image processor improved so that the flatness of the carriage can be adjusted to prevent said carriage from tilting even with the arrangement in which said carriage is supported on the guide tracks via four legs.

SUMMARY OF THE INVENTION

The first object set forth above is achieved, according to this invention, by a carriage driving mechanism in an image processor comprising a housing, carriage provided with legs by which said carriage is supported on guide tracks of said housing and a light source lamp mounted on said carriage wherein said carriage is driven to scan an original by irradiating successively different locations of said original with light rays emitted from said light source lamp and thereby to optically pick up image information from said original, said carriage driving mechanism for such image processor characterized by that said carriage is provided with tilt preventing means to prevent said carriage from tilting even if said carriage tends to tilt.

Even if the carriage tends to jump up from guide tracks, for example, during transport of the image processor due to an unexpected force is exerted on the carriage, said tilt preventing means prevent the carriage from further jumping up or floating off from the guide tracks. As a result, it is not apprehended that the carriage might tilt under a tensile force of wire, and the carriage reliably restores its normal position for scanning. In this way, it is avoided that the carriage might remain in its tilt state.

Said tilt preventing means are mounted on the carriage at its appropriate locations so that said tilt preventing means come in contact or engagement with appropriate locations of said housing and thereby prevent said carriage from tilting even if said carriage tends to tilt.

If the carriage tends to jump up or float off from the guide tracks, said tilt preventing means come in contact with a part of the housing, e.g., a top plate and thereby restrict further jumping up or floating off of the carriage.

Said tilt preventing means are mounted on the carriage at its appropriate locations so that said tilt preventing means come in engagement with a predetermined length of wire serving to drive said carriage and thereby prevent said carriage from tilting even if said carriage tends to tilt.

If the carriage tends to jump up or float off from the guide tracks due to an unexpected force exerted thereon, for example, during transport of the image processor, said tilt preventing means come in engagement with said wire and thereby restrict further jumping up or floating off.

Said tilt preventing means are provided in the form of contact arms extending upward from transversely opposite ends of said carriage so that said contact arms come in contact with a top plate of said housing and thereby prevent said carriage from tilting. Alternatively, said tilt preventing means are provided in the form of contact lugs extending laterally from the transversely opposite ends of said carriage so that said contact lugs come in contact with lower surfaces of the guide tracks supporting said carriage and thereby prevent said carriage from tilting. According to another embodiment, said tilt preventing means are provided in the form of contact lugs extending upward from an upper end of said carriage so that said contact lugs come in contact with the top plate of the housing and thereby prevent said carriage from tilting.

Such unique arrangement allows the tilt preventing means to be mounted on the carriage at the locations, which do not affect strength as well as a function of the carriage, for example, the upper end and lateral end of the carriage. In addition, the locations adapted to come in contact or engagement with the tilt preventing means can be appropriately selected, for example, a part of the housing.

The carriage is formed with supporting arms extending from said carriage in the scanning direction and said supporting arms are provided on their forward ends with contact pins laterally extending from said forward ends so that said contact pins come in contact with said wire to prevent said carriage from tilting.

With such arrangement, said supporting arms are combined with said contact pins to form the tilt preventing means. When the carriage tends to jump up and to tilt, said contact pins come in engagement with the wire to prevent the carriage from remaining in its tilt position.

Said tilt preventing means are provided in the form of brackets detachably attached to the carriage so that said brackets come in contact with appropriate locations of the housing or with said wire and thereby prevent said carriage from tilting.

The tilt preventing means can be mounted on the existing image processor since the tilt preventing means are provided in the form of brackets adapted to be detachably mounted on the carriage. It is also possible to attach these brackets to the carriage only during transport of the image processor and to detach them once the image processor has been installed.

The second object of the invention is achieved by an arrangement that said legs are formed on their surfaces destined to come in contact with the guide tracks with depressions serving as oil sumps and these oil sumps are filled with lubricant.

During travel of the carriage along the guide tracks, lubricant filled in said oil sumps is supplied to contact surfaces between the soles of the respective legs and the guide tracks and therefore the carriage can smoothly travel along the guide tracks. In response to decrease of lubricant as the processor is operated for a long period, said contact surfaces are supplemented from said oil sumps with fresh lubricant and thereby loss of lubricant is avoided.

This invention provides also, in an image processor comprising a housing, carriage provided with legs by which said carriage is supported on guide tracks of said housing and a light source lamp mounted on said carriage wherein said carriage is driven to scan an original by irradiating successively different locations of said original with light rays emitted from said light source lamp and thereby to optically pick up image information from said original, a carriage driving mechanism for such image processor characterized by that said legs are formed on their surfaces destined to come in contact with the guide tracks with depressions serving as oil sump and these oil sumps are filled with lubricant.

Lubricant supplemented from said oil sumps formed in the legs of the carriage to said contact surfaces allows the carriage to travel smoothly along the guide tracks. Even if the processor is operated for a relatively long period, loss of lubricant is avoided by supplement of lubricant from the oil sumps. Smooth travel of the carriage is not accompanied with undesirable jumping up or floating off of the carriage. The oil sumps present substantially conical shapes.

By conically shaping said oil sumps, working of the leg provided with such conical oil sump is facilitated. Particularly when the leg is made of synthetic resin, a mold for injection or the like can be simplified and working of the leg is further facilitated.

The lubricant is preferably grease. Grease having an appropriate viscosity is preferable as lubricant in order to avoid an undesirable situation that lubricant easily might drain out from said oil sumps and cannot function for a long period.

Said third object of this invention is achieved by an arrangement that said carriage is provided with four legs serving to support said carriage of which at least one is implemented in the form of a height-adjustable leg.

With this arrangement, the carriage is supported first by the non-adjustable three legs with a desired flatness and then a mounting height of said adjustable leg is adjusted to ensure that the carriage is supported by four legs more reliably.

Said carriage is provided with four legs serving to support said carriage of which at least one is inserted into a through-hole formed in said carriage so that an insertion length of this one leg may be adjusted to adjust a height of this one leg in its mounted state.

A mounting height of the adjustable leg can be adjusted as this leg is screwed into said through-hole. Adjustment is easily carried out merely by adjusting a length of the leg by which said leg is screwed into said through-hole.

This invention provides also, in an image processor comprising a housing, carriage provided with legs by which said carriage is supported on guide tracks of said housing and a light source lamp mounted on said carriage wherein said carriage is driven to scan an original by irradiating successively different locations of said original with light rays emitted from said light source lamp and thereby to optically pick up image information from said original, a carriage driving mechanism for such image processor characterized by that at least one of said legs is implemented in the form of a height-adjustable leg.

The mounting height of the adjustable leg is adjusted so that the carriage can be reliably supported by four legs with a desired flatness. Thereby the carriage can travel with a high stability without an apprehension that the carriage might readily float off from the guide tracks during its travel.

This invention further provides, in an image processor comprising a housing, carriage provided with legs by which said carriage is supported on guide tracks of said housing and a light source lamp mounted on said carriage wherein said carriage is driven to scan an original by irradiating successively different locations of said original with light rays emitted from said light source lamp and thereby to optically pick up image information from said original, a carriage driving mechanism for such image processor characterized by that at least one of said legs is inserted into a through-hole formed in said carriage and an insertion length of this one leg is adjusted to adjust a height of this one leg in mounted state.

Operation of adjustment is achieved merely by adjusting a length of the leg by which it is screwed into the through-hole. This adjustment stabilizes travel of the carriage and prevents the carriage from readily floating off from the guide tracks during its travel.

Said through-hole is formed with a female thread while said one leg is formed with a male thread so that a height of said one leg in mounted state can be adjusted.

The leg is driven forward or backward depending on the direction in which the leg is rotated with its male thread engaged with the female thread of the through-hole. In this manner, the length of the leg by which said leg is screwed into the through-hole and thereby the mounting height of said leg is adjusted. This adjustment is easily achieved merely by rotating the male thread. The height-adjustable leg is mounted on the carriage at a location most remote from the carriage's center of gravity. The adjustable leg is provided at a location as remote as possible from the carriage's gravity center so that a fine adjustment of the carriage's flatness can be easily carried out.

It should be understood that it is possible to provide a plurality of the adjustable legs or to implement all of four legs in the form of the adjustable legs.

DETAILED DESCRIPTION OF THE EMBODIMENTS

Details of the carriage driving mechanism in the image processor according to this invention will be more fully understood from the following description of preferred embodiments given hereunder in reference with the accompanying drawings.

Figure 1:
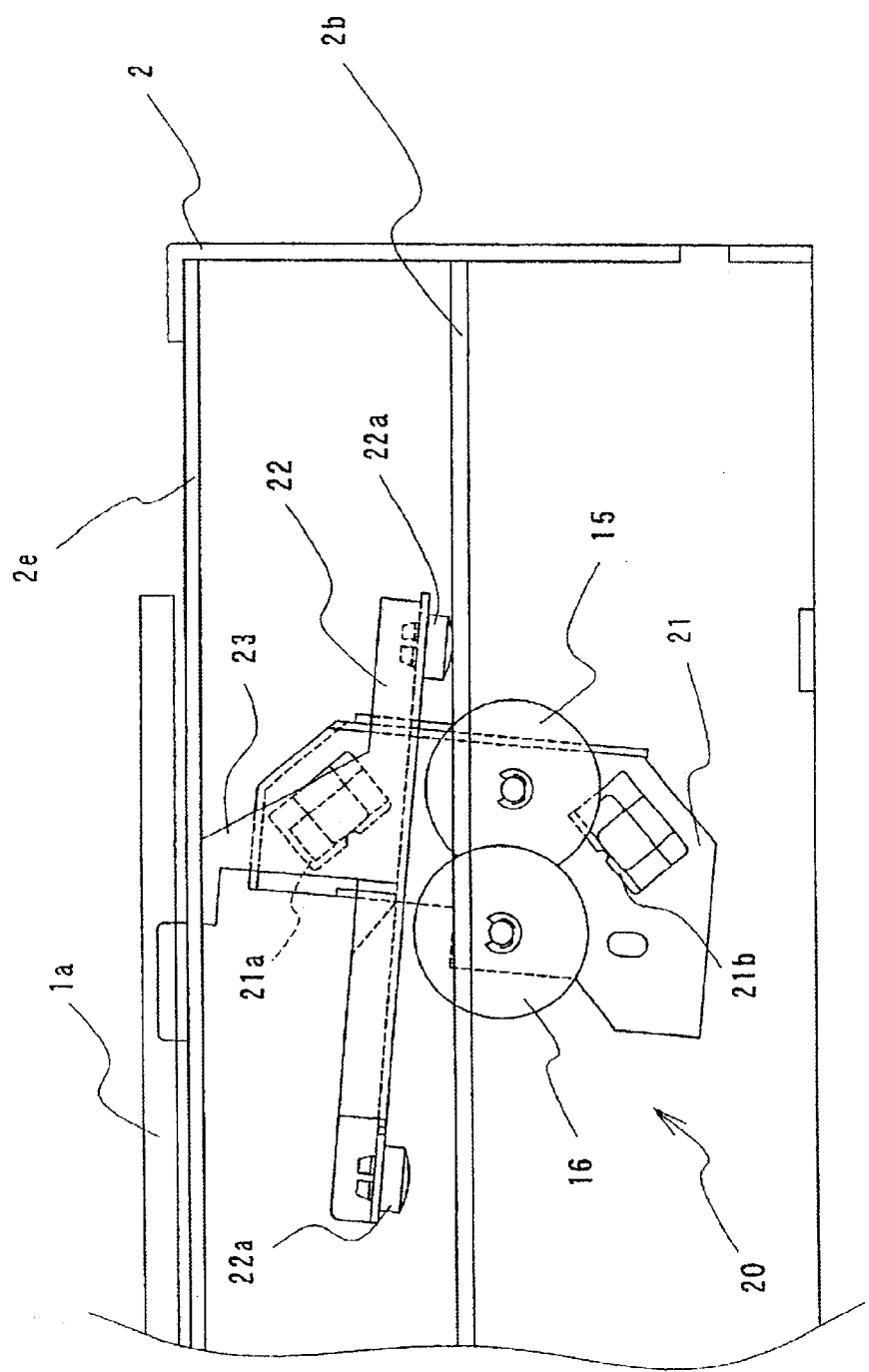
FIG. 1 is a side view showing a first embodiment of the tilt preventing means in the carriage driving mechanism according to this invention in relationship with the housing as partially eliminated.
Figure 2:
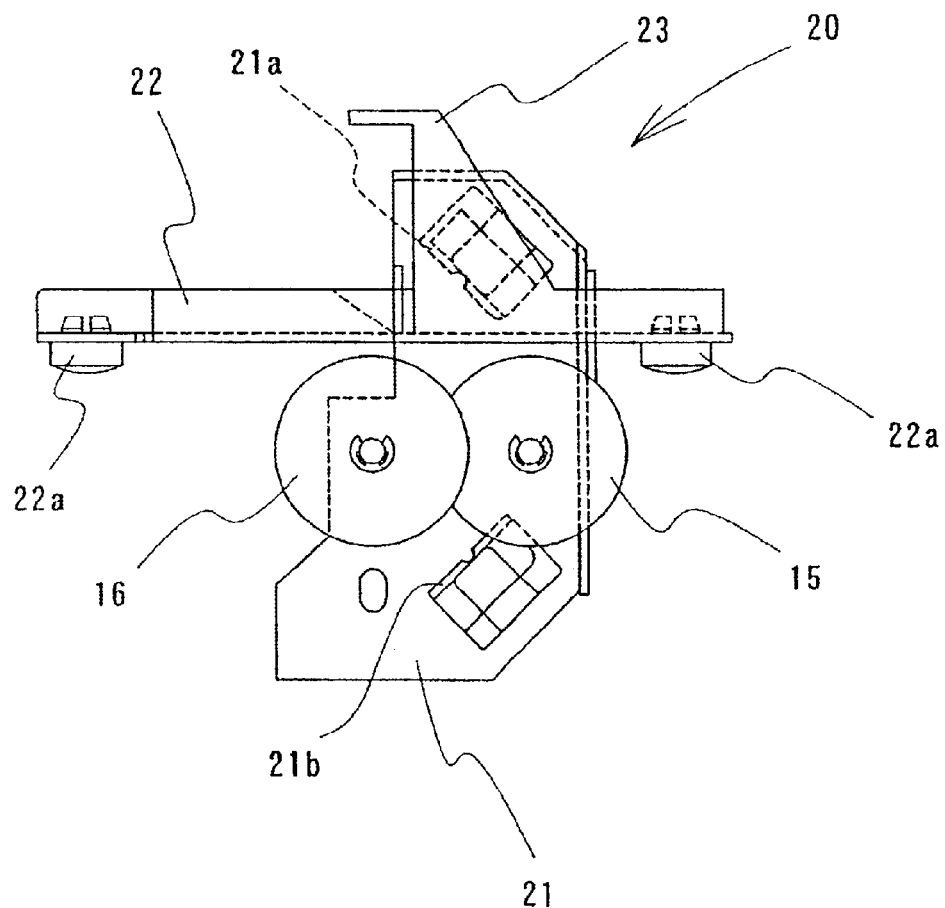
FIG. 2 is a side view showing said first embodiment of the tilt preventing means in the carriage driving mechanism.

FIGS. 1 and 2 show a first embodiment of the tilt preventing means for the carriage. FIG. 2 is a side view of a half-rate carriage 20 comprising a carriage body 21 provided with said reflector (not shown) and support portions 22 extending outward from longitudinally opposite ends of said carriage body 21. A second reflector is held by a second bracket 21a and a third reflector is held by a third bracket 21b. Said support portions 22 are provided at their ends with legs 22a, respectively. As will be apparent from FIG. 1, the carriage body 21 is placed on the guide tracks 2b of housing 2 with interposition of these legs 22a. The carriage body 21 is provided on its longitudinally opposite side surfaces with said guide pulleys 15, 16.

As shown in FIG. 1, a platen glass 1a is supported on a top plate 2e of the housing 2. Specifically, said top plate 2e is formed in its central zone with an opening and said platen glass 1a is placed on the housing 2 so as to close said opening.

Each of said support portions 22 are further provided substantially at its longitudinal middle zone with a contact arm 23 serving as tilt preventing means. This arm 23 extends upward from said middle zone and has its upper end portion being hooked.

With this carriage driving mechanism including the tilt preventing means according to the first embodiment, even if the front or rear legs 22a float off from the guide tracks 2b as an unexpected force is exerted upon the half-rate carriage 20 as seen in FIG. 1, said upper end portion of said contact arms 23 come in contact with a lower surface of said top plate 2e and prevent the half-rate carriage 20 from further floating off the guide track 2b. In this way, the half-rate carriage 20 is prevented from remaining in its tilted position, i.e., said half-rate carriage 20 can immediately restore its normal position on the guide tracks 2b desired to perform a proper operation of scanning.

Figure 3:
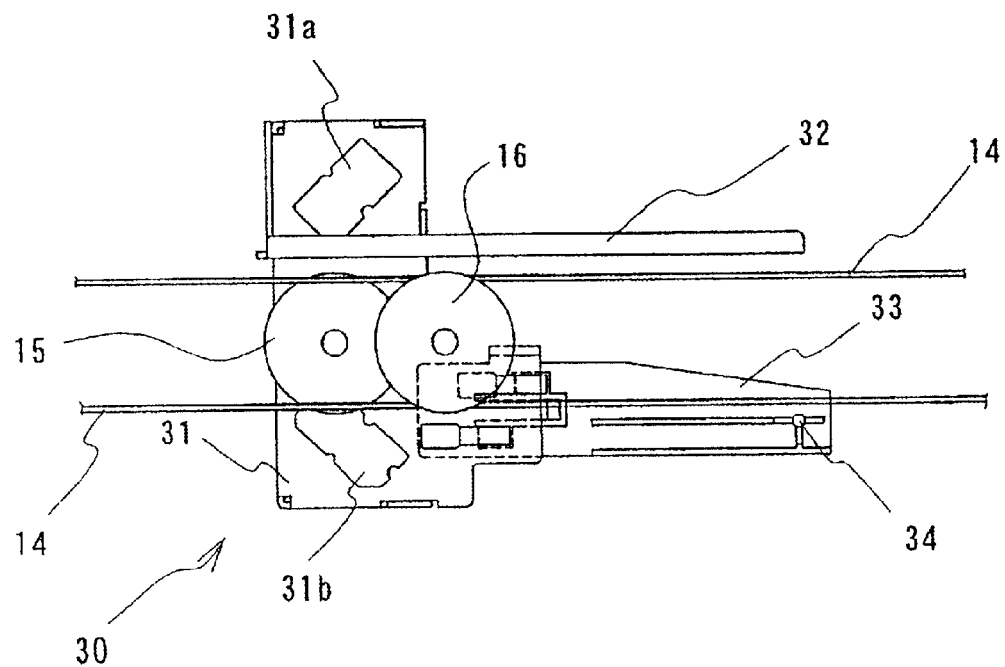
FIG. 3 is a side view showing a second embodiment of the tilt preventing means in the carriage driving mechanism as partially eliminated.
Figure 4:
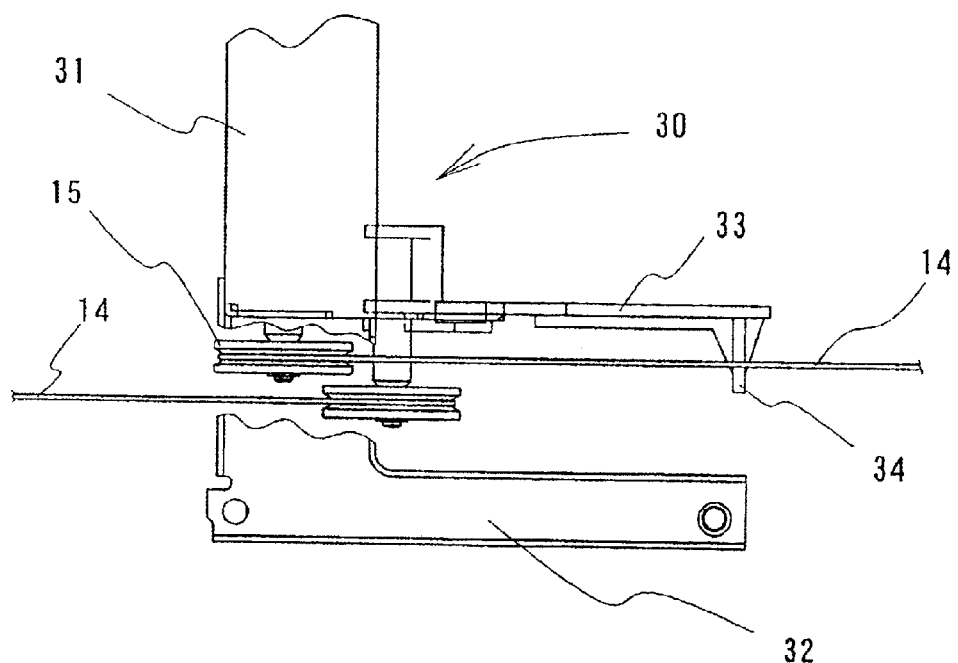
FIG. 4 is a plan view showing said second embodiment of the tilt preventing means in the carriage driving mechanism.
Figure 5:
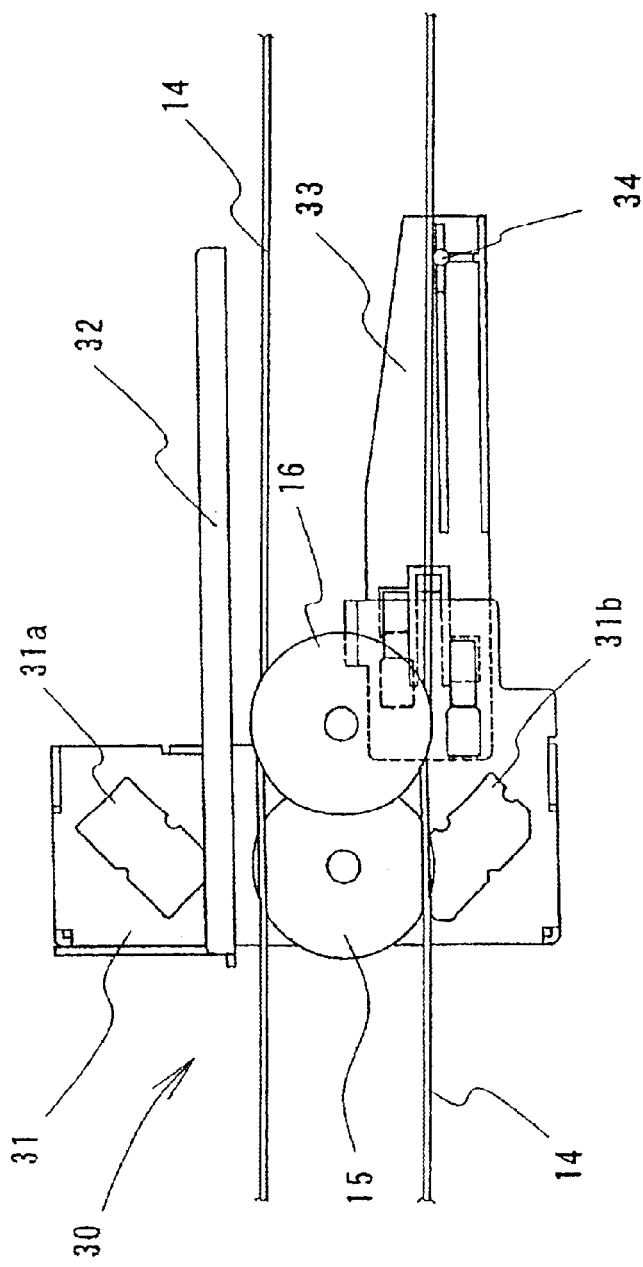
FIG. 5 is a side view illustrating a manner in which said second embodiment of the tilt preventing means in the carriage driving mechanism operates.

FIGS. 3–5 illustrate a second embodiment of the tilt preventing means in the carriage driving mechanism. The half-rate carriage 30 is provided on a carriage body 31 with a bracket 33 supporting a flexible substrate for a circuit adapted to drive a fluorescent lamp so that said substrate extends forward in the scanning direction. According to this embodiment, said bracket 33 functions as a supporting arm. The second and third reflectors are supported by a second bracket 31a and a third bracket 31b, respectively. On longitudinally opposite side surfaces of the carriage body 31, there are provided said guide pulleys 15, 16 about which the wire 14 is draped. The carriage body 31 is further provided on its longitudinally opposite side surfaces with supporting members 32 adapted to be placed on the guide tracks 2b of the housing 2.

Said bracket 33 adapted to support said substrate is provided at its front end with a contact pin 34 serving as the tilt preventing means. As shown by FIG. 4, this contact pin 34 laterally extends through a plane in which said wire 14 travels and in a zone, which is surrounded by, said wire 14.

With the carriage driving mechanism including the tilt preventing means according to this second embodiment, even if the half-rate carriage 30 tends to float off from the guide tracks due to an unexpected force exerted thereupon, said contact pins 34 come in contact with the wire 14 and thereby prevent the half-rate carriage 30 from further floating off from the guide tracks. In this way, the half-rate carriage 30 is restricted from floating off from the guide tracks and rapidly restores its normal position. In the case of the carriage not provided with said bracket 33 for the substrate, a supporting arm similar to said bracket 33 for the substrate may be separately provided to achieve the desired effect.

Figure 6:
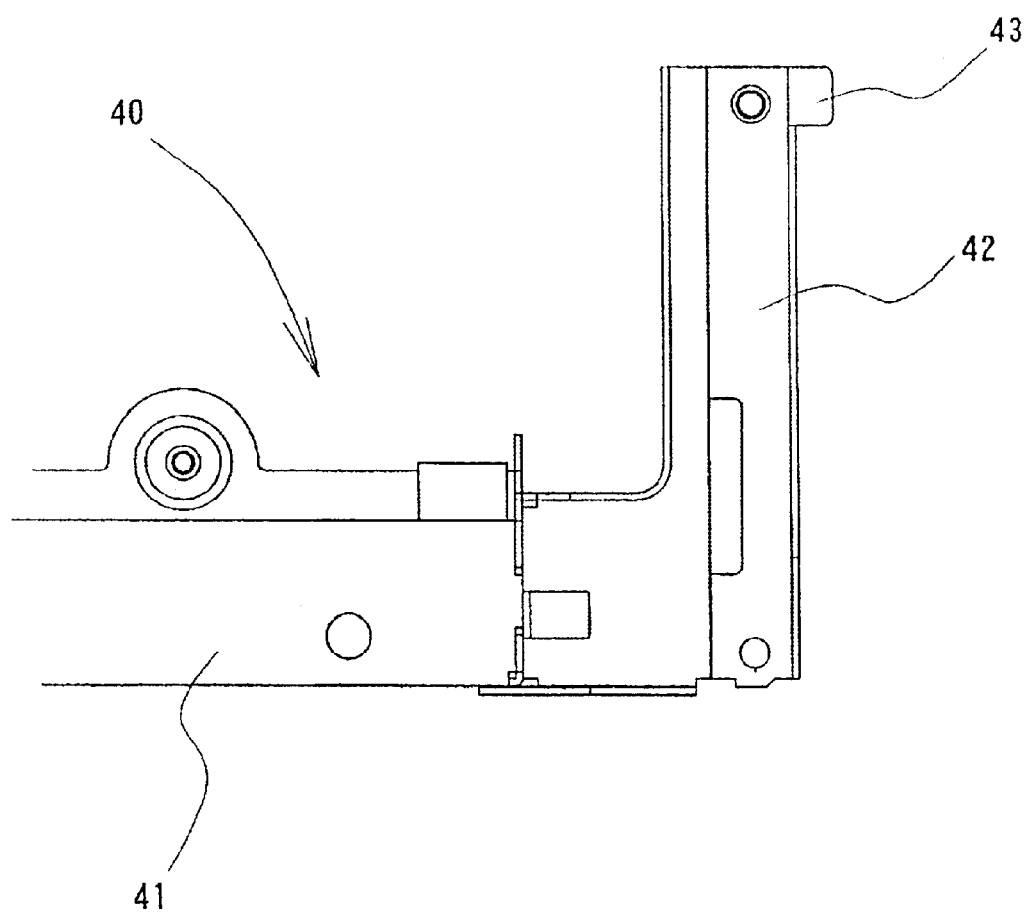
FIG. 6 is a plan view showing a third embodiment of said tilt preventing means in the carriage driving mechanism as partially eliminated.
Figure 7:
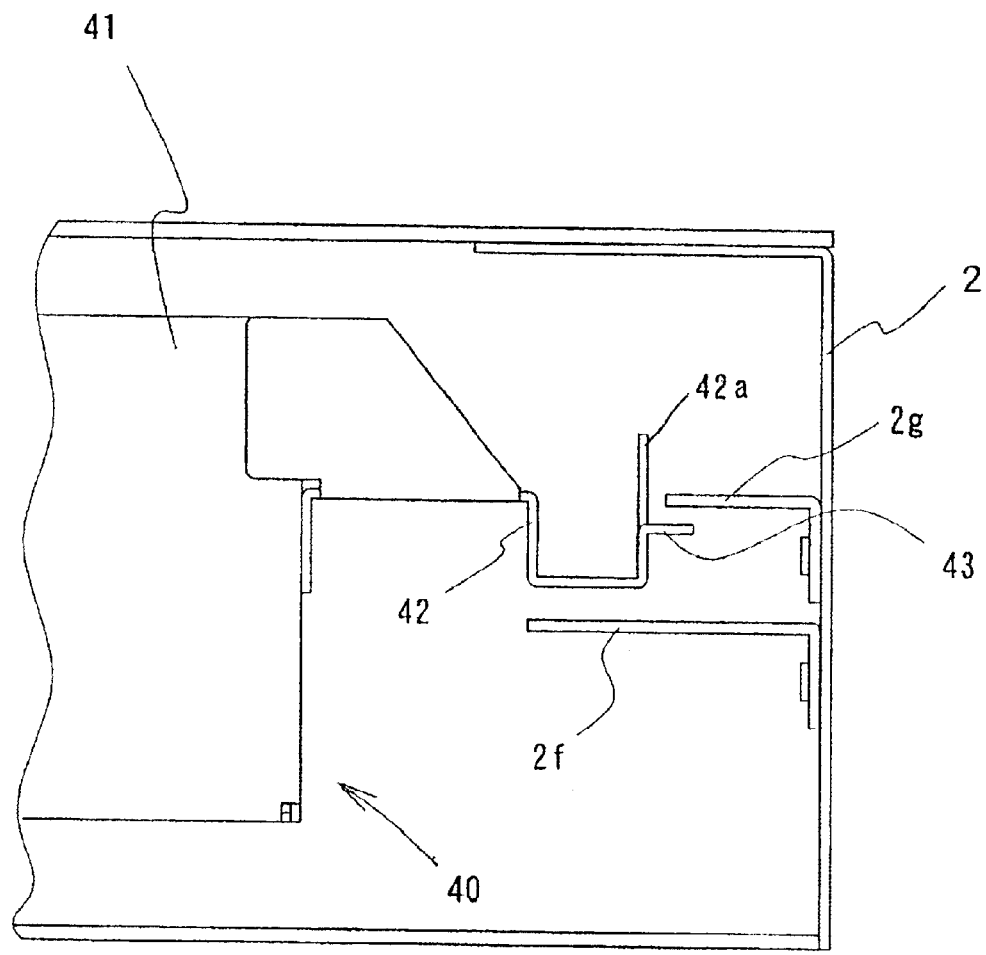
FIG. 7 is a front sectional view showing the housing adapted for the carriage driving mechanism adopting said third embodiment of the tilt preventing means as partially eliminated.
Figure 8:
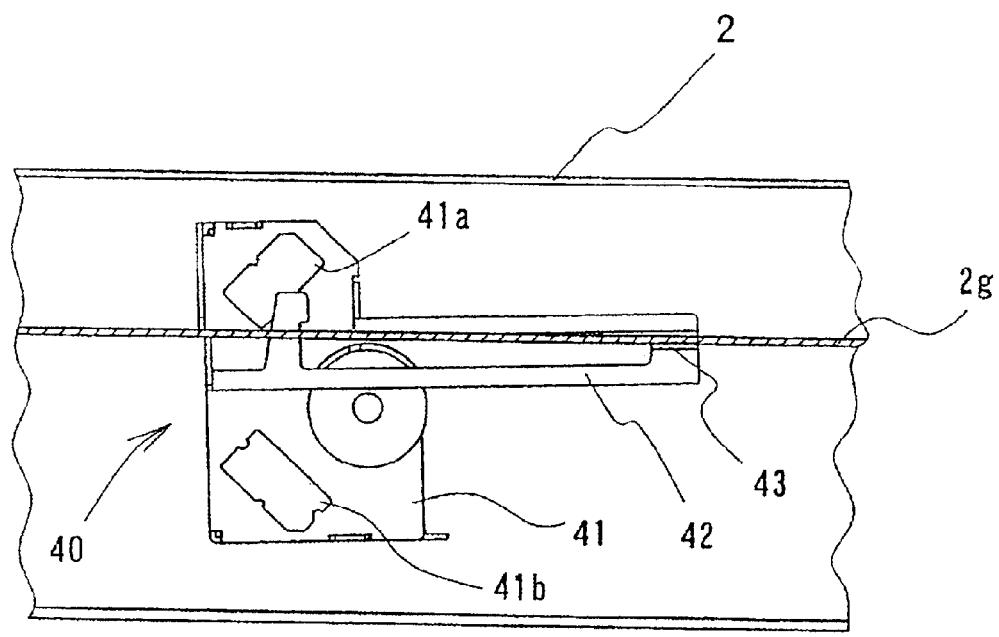
FIG. 8 is a side view illustrating a manner in which said third embodiment of the tilt preventing means in the carriage driving mechanism operates.

FIGS. 6–9 illustrate a third embodiment of the tilt preventing means in the carriage driving mechanism. Referring to FIG. 7, a half rate carriage 40 is adapted to be used with the housing 2 having guide tracks 2f exclusively supporting the half-rate carriage 40 and guide tracks 2g exclusively supporting the full-rate carriage. As will be apparent from FIG. 7, the full-rate carriage is supported on the upper guide tracks 2g and the half-rate carriage 40 is supported on the lower guide tracks 2f.

Referring to FIG. 6, a carriage body 41 of the half-rate carriage 40 is provided at its longitudinally opposite ends with supporting portions 42. The supporting portion 42 is provided with a bumper lug 43 laterally extending to serve as the tilt preventing means. As will be best seen in FIG. 7, a laterally outer portion of the supporting portion 42 is bent upward to form a guide wall 42a and said bumper lug 43 is formed at an appropriate level of this guide wall 42a so that said bumper lug 43 may lie below the guide track 2g for the full-rate carriage. The second and third reflectors are supported by a second bracket 41a and a third bracket 41b (FIGS. 8–9), respectively.

Figure 9:
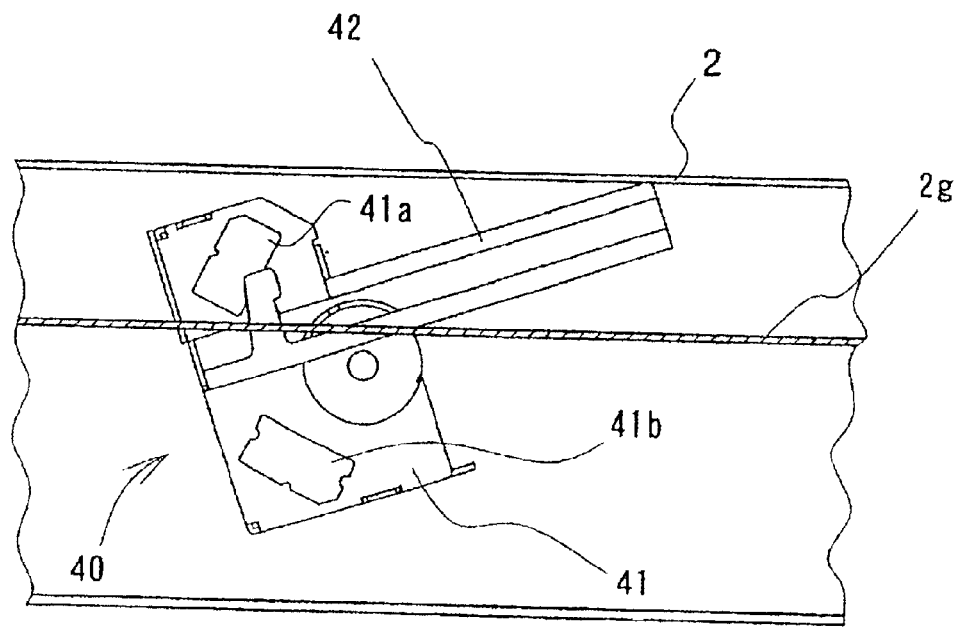
FIG. 9 is a side view illustrating a manner in which the carriage driving mechanism is supposed to operate on the assumption that said third embodiment of the tilt preventing means is absent, in comparison with the case illustrated by FIG. 8.

With this carriage driving mechanism including the tilt preventing means according to the third embodiment, even if the half-rate carriage 40 tends to float off from the guide tracks 2f due to an unexpected force exerted thereupon, the bumper lugs 43 come in contact with the lower surface of the guide tracks 2g exclusively for the full-rate carriage 3 and thereby prevent said half-rate carriage 40 from further floating off from the guide track 2f. In this way, the half-rate carriage 40 is reliably prevented from remaining in its tilted position and can rapidly restore its normal position. FIG. 9 illustrate the case in which the carriage 40 is not provided with said bumper lug 43 and consequently the half-rate carriage 40 cannot restore its normal position once it has tilted.

Figure 10:
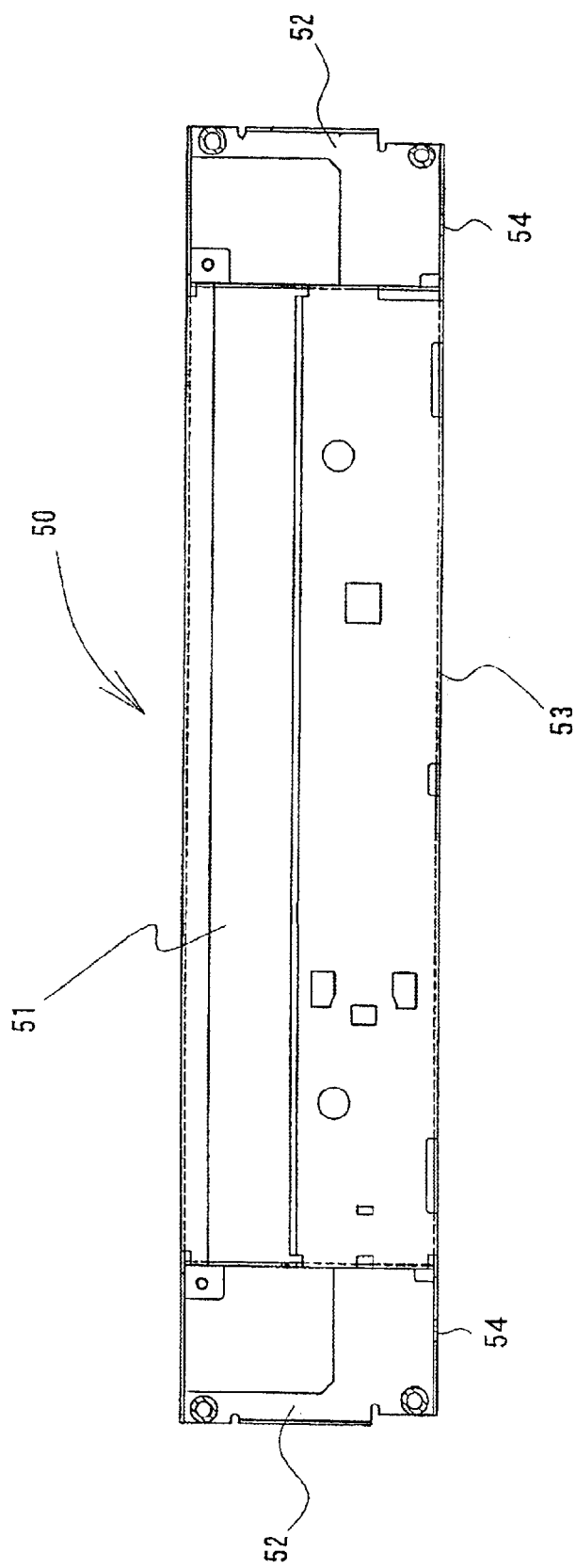
FIG. 10 is a plan view showing a fourth embodiment of the tilt preventing means in the carriage driving mechanism as partially eliminated.
Figure 11:
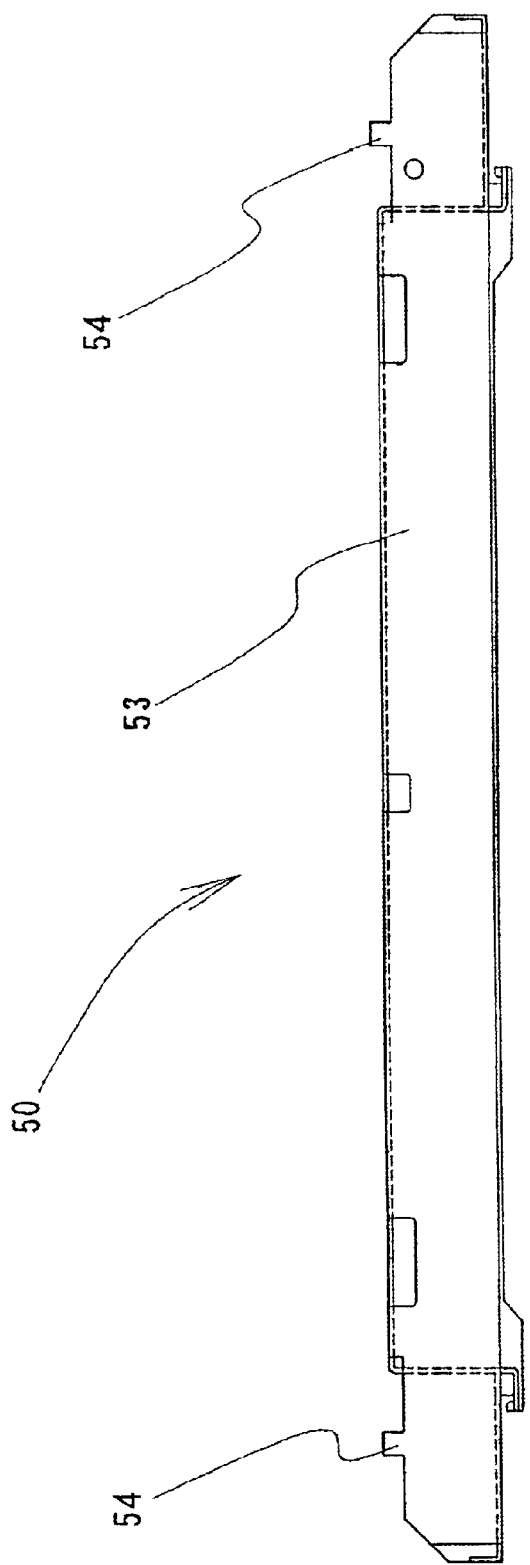
FIG. 11 is a front view showing said fourth embodiment of the tilt preventing means previously shown by FIG. 10 in a plan view.

FIGS. 10–13 illustrate the carriage driving mechanism including a fourth embodiment of the tilt preventing means. This fourth embodiment is illustrated herein with respect to the tilt preventing means used for the full-rate carriage. FIG. 10 is a plan view of a full-rate carriage 50, and FIG. 11 is a front view of this full-rate carriage 50. The source lamp, such as a fluorescent lamp, is mounted on a carriage body 51 which is, in turn, provided at its longitudinally opposite ends with supporting portions 52 adapted to be placed upon the guide tracks 2b of the housing 2. The full-rate carriage 50 is provided along its front edge with a front wall 53 extending over a full length of the carriage body and partial length of the supporting portions 52. The portions of this front wall 53 extending along the partial lengths of the respective supporting portions 52 are provided with contact lugs 54 each having an appropriate length and extending upward so that they can function as the tilt preventing means. The first reflector adapted to reflect the light ray with which the original has been irradiated is supported by a first bracket 55.

Figure 12:
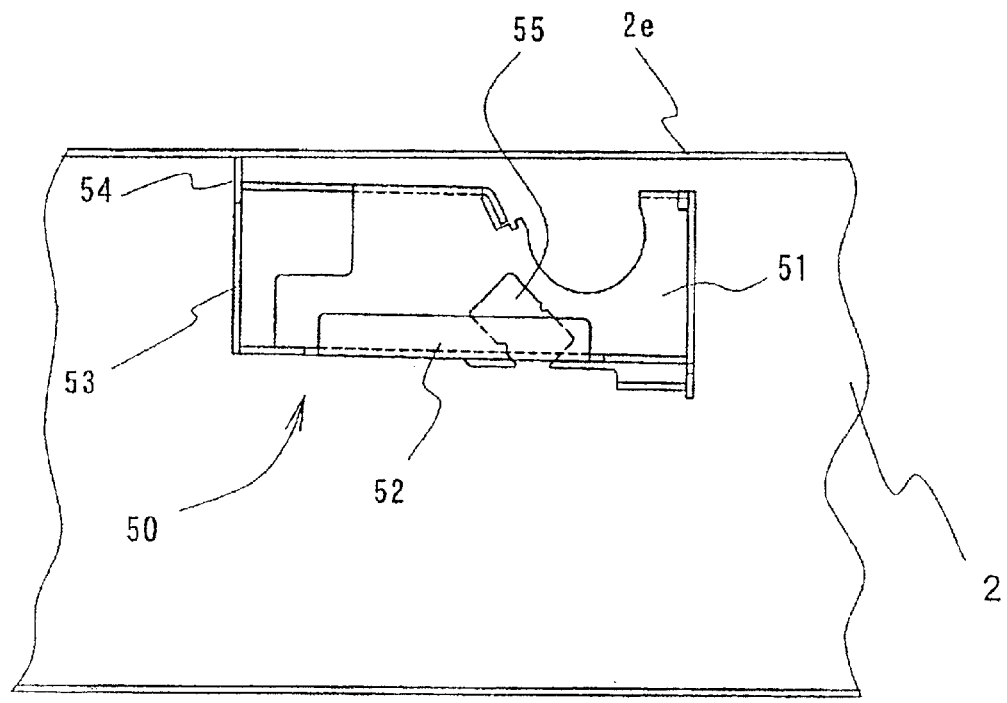
FIG. 12 is a side view illustrating a manner in which said fourth embodiment of the tilt preventing means in the carriage driving mechanism operates.
Figure 13:
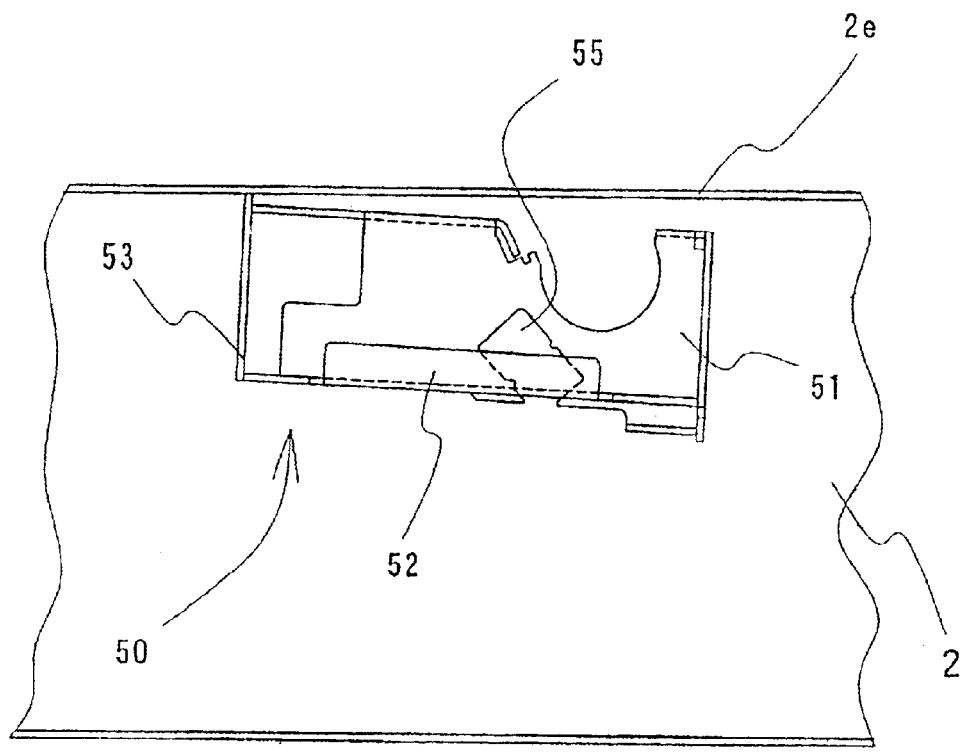
FIG. 13 is a side view illustrating a manner in which the carriage driving mechanism operates on the assumption that said fourth embodiment of the tilt preventing means is absent, in comparison with the case illustrated by FIG. 12.

With the carriage driving mechanism including the tilt preventing means according to this fourth embodiment, even if the full-rate carriage 50 tends to float off from the guide tracks 2b due to an unexpected force exerted thereon, said contact lugs 54 come in contact with the lower surface of the top plate 2e of the housing 2, as seen in FIG. 12, and restrict the full-rate carriage 50 from further floating off from the guide tracks 2b. In this way, the full-rate carriage 50 rapidly restores its normal position. FIG. 13 illustrates the full-rate carriage 50 not provided with said contact lugs 54 as in its floating and tilting position.

Figure 14:
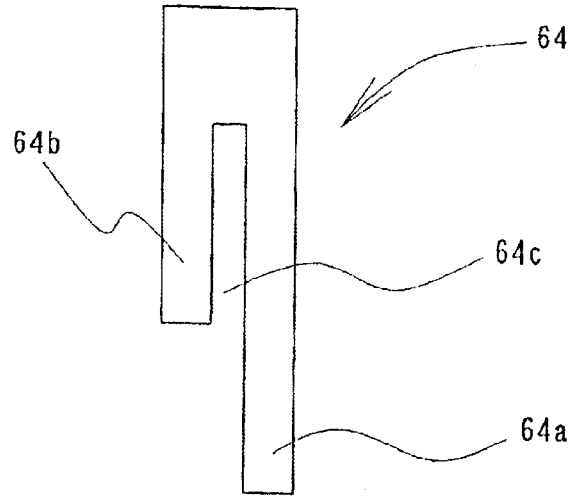
FIG. 14 shows a fifth embodiment of the tilt preventing means in the carriage driving means in a side view (a) and a rear view (b)
Figure 14:
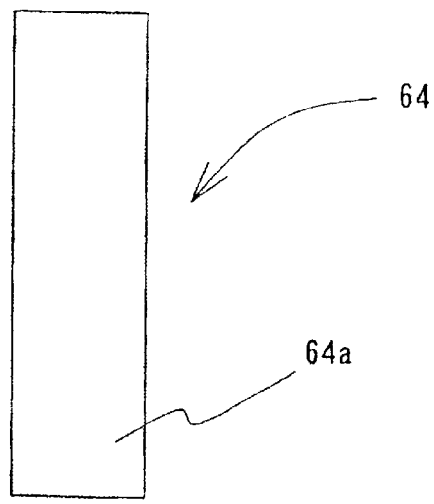
Figure 15:
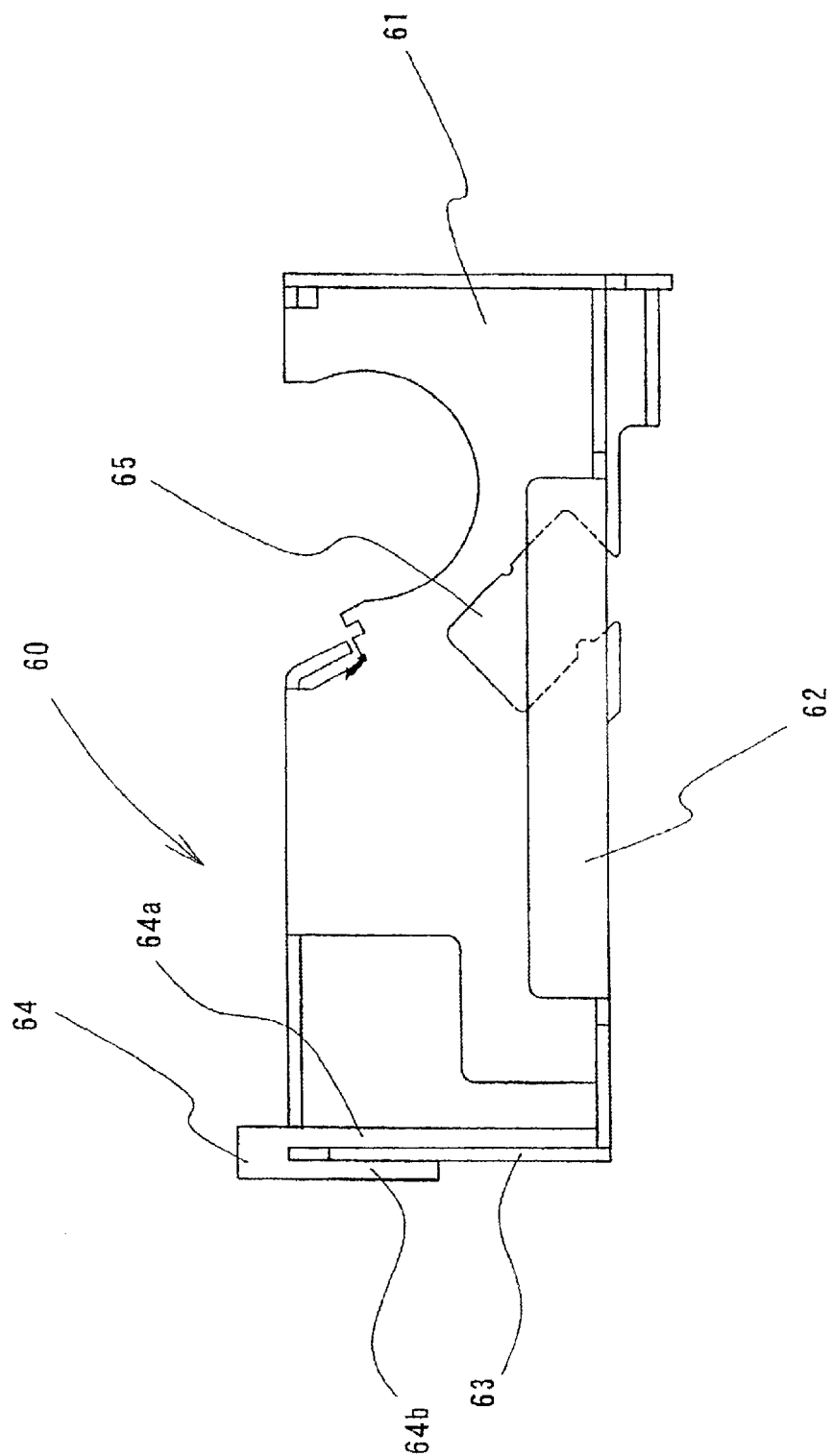
FIG. 15 is a side view showing said fifth embodiment of the tilt preventing means in the carriage driving means.
Figure 16:
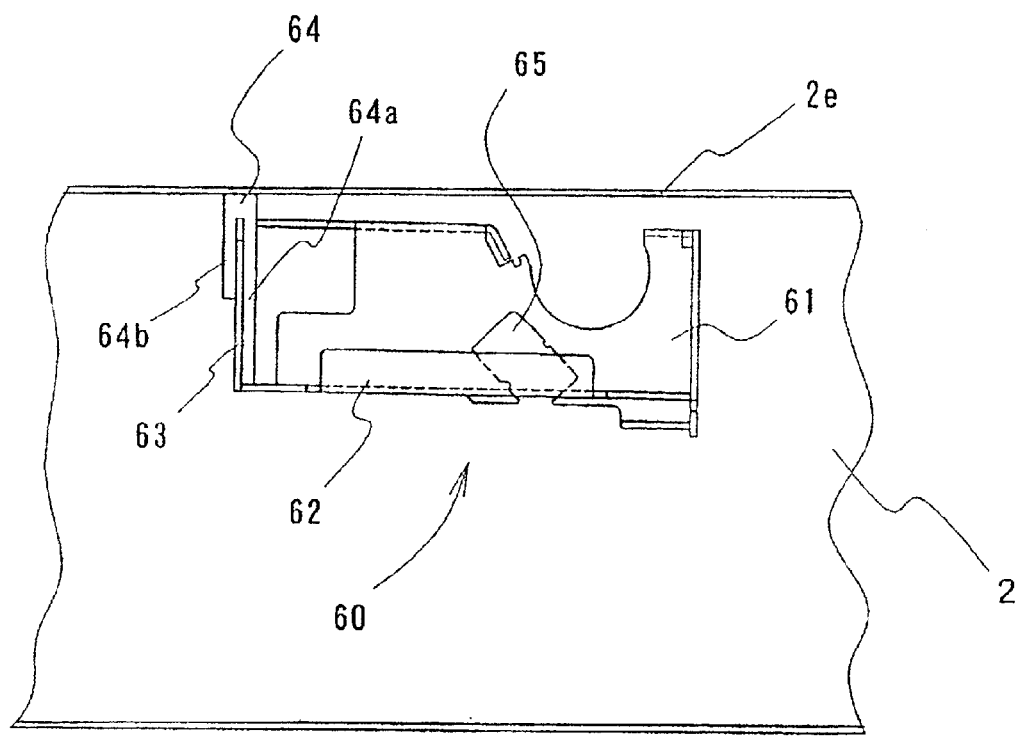
FIG. 16 is a side view illustrating a manner in which said fifth embodiment of the tilt preventing means in the carriage driving mechanism operates.

FIGS. 14–17 illustrate a fifth embodiment of the tilt preventing means in the carriage driving mechanism. This fifth embodiment of the tilt preventing means is illustrated to be provided in association with a full-rate carriage 60 (FIGS. 15 and 16). Similarly to the full-rate carriage 50 including the tilt preventing means according to the fourth embodiment, a carriage body 61 of a full-rate carriage 60 is provided at its longitudinally opposite ends with support portions 62 adapted to be placed upon the guide tracks 2b of the housing 2. In addition, the full-rate carriage 60 is provided along its front edge with a front wall 63 (FIG. 15) extending over a full length of the carriage body and partial length of the supporting portions 62. The portions of this front wall 63 extending along the partial lengths of the respective supporting portions 62 are provided with bumper brackets 64 detachably mounted thereon so as to function as the tilt preventing means. FIG. 14 illustrates one of these bumper brackets 64 presenting a substantially square U-shaped cross-section of which one leg 64a is dimensioned to be longer than the other leg 64b. A slit defined between these two legs 64a, 64b serves as a receiving slit 64c having a width dimensioned to be substantially equal to a thickness of said front wall 63.

As will be seen in FIG. 15, said bumper bracket 64 may be mounted the full-rate carriage 60 by engaging the front wall 63 of said carriage 60 with said receiving slit 64c of said bracket 64 with its shorter leg 64b lying outside. To ensure that said bracket 64 should not be slipped off from said front wall 63, it is possible to secure said bracket 64 to said front wall 63 by means of adhesive. The first reflector functioning to reflect the light ray with which the original has been irradiated is mounted on a first bracket 65.

Figure 17:
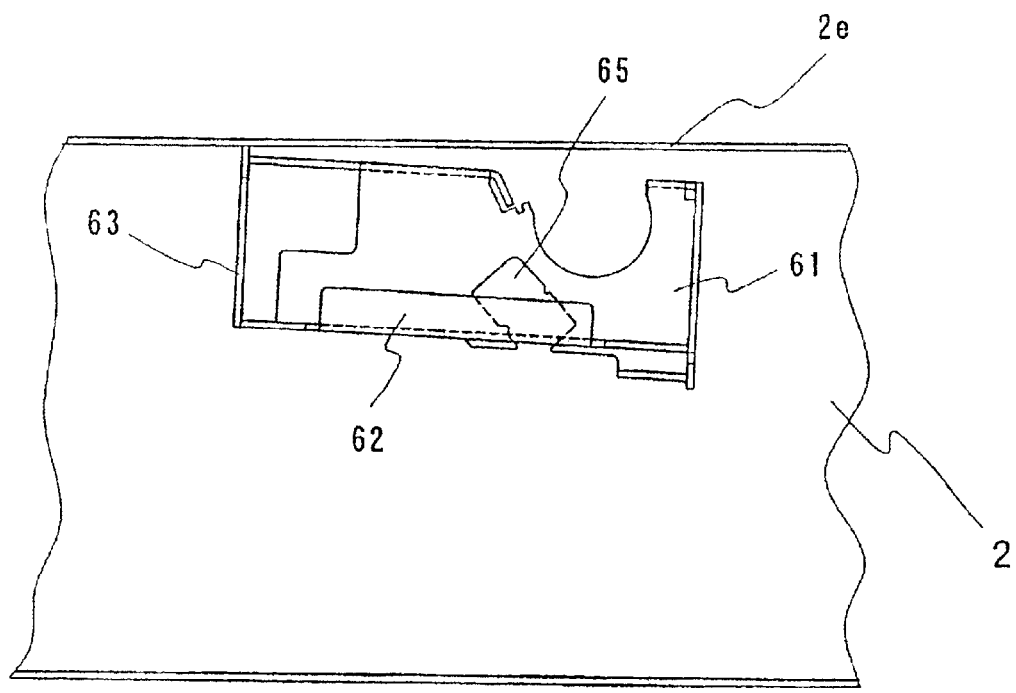
FIG. 17 is a side view illustrating a manner in which the carriage driving means is supposed to operate on the assumption that said fifth embodiment of the tilt preventing means is absent, in comparison with the case illustrated by FIG. 16.

With the carriage driving mechanism including such tilt preventing means according to the fifth embodiment, even if the full-rate carriage 60 tends to float off from the guide tracks due to an unexpected force exerted thereupon, the upper ends of the bumper brackets 64 come in contact with the lower surface of the top plate 2e of the housing 2 and thereby prevent the full-rate carriage 60 from further floating off from the guide tracks, as seen in FIG. 16. In this way, the full-rate carriage 60 is prevented from remaining in its tilted position and can rapidly restore its normal position. FIG. 17 illustrates the full-rate carriage 60 not provided with the bumper brackets 64 as remaining in its tilted position.

While the fifth embodiment has been described with respect to the case in which the bumper brackets 64 come in contact with the top plate 2e, the bumper brackets may be appropriately positioned and/or configured so that they come in contact with the wire 14.

While the first-fifth embodiments of the tilt preventing means have been described separately with respect to those used with the full-rate carriage and those used with the half-rate carriage, it should be understood that any one of these embodiments may be used with any one of said full-rate carriage and half-rate carriage. Furthermore, both the full-rate carriage and the half-rate carriage may be provided with the tilt preventing means.

Figure 19:
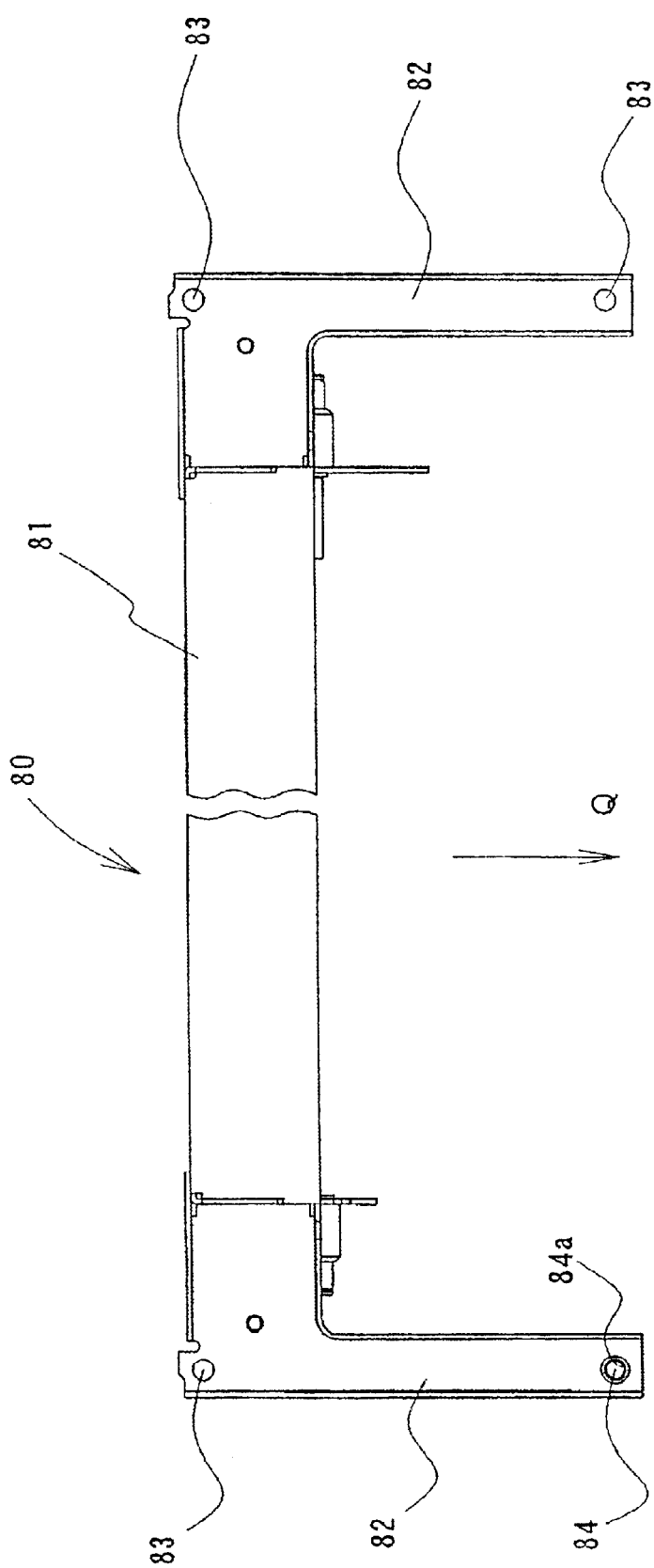
FIG. 19 is a plan view showing an example of the half-rate carriage adapted to be provided with the carriage driving mechanism according to this invention.
Figure 20:
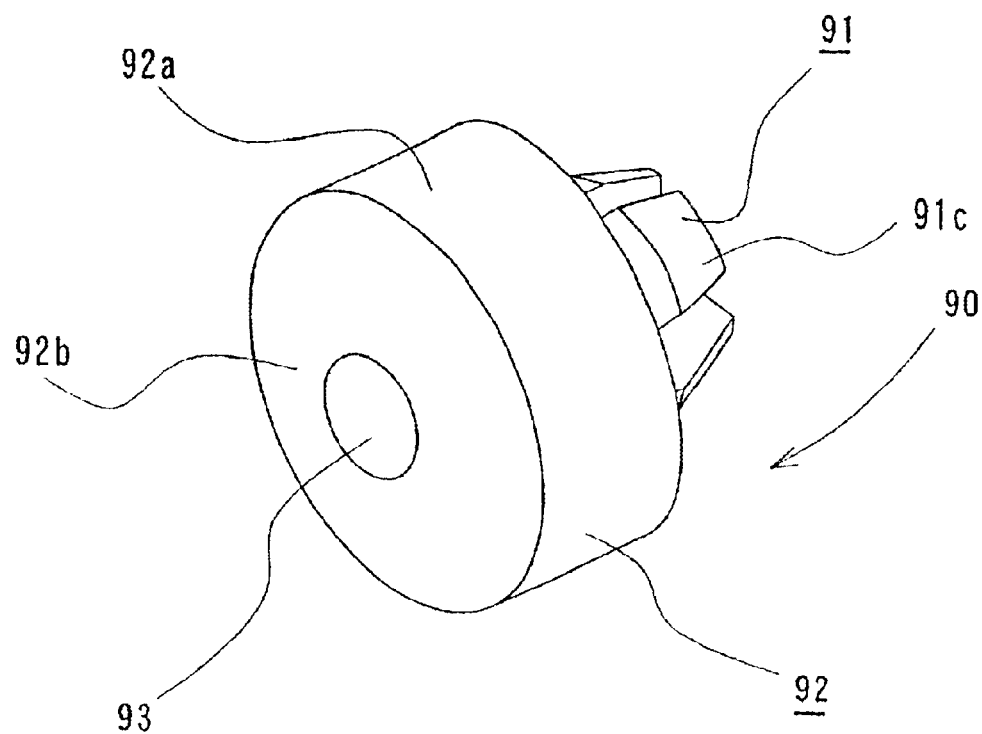
FIG. 20 is a perspective view showing an embodiment of the legs associated with the carriage driving mechanism according to this invention in order to support the carriage.
Figure 21:
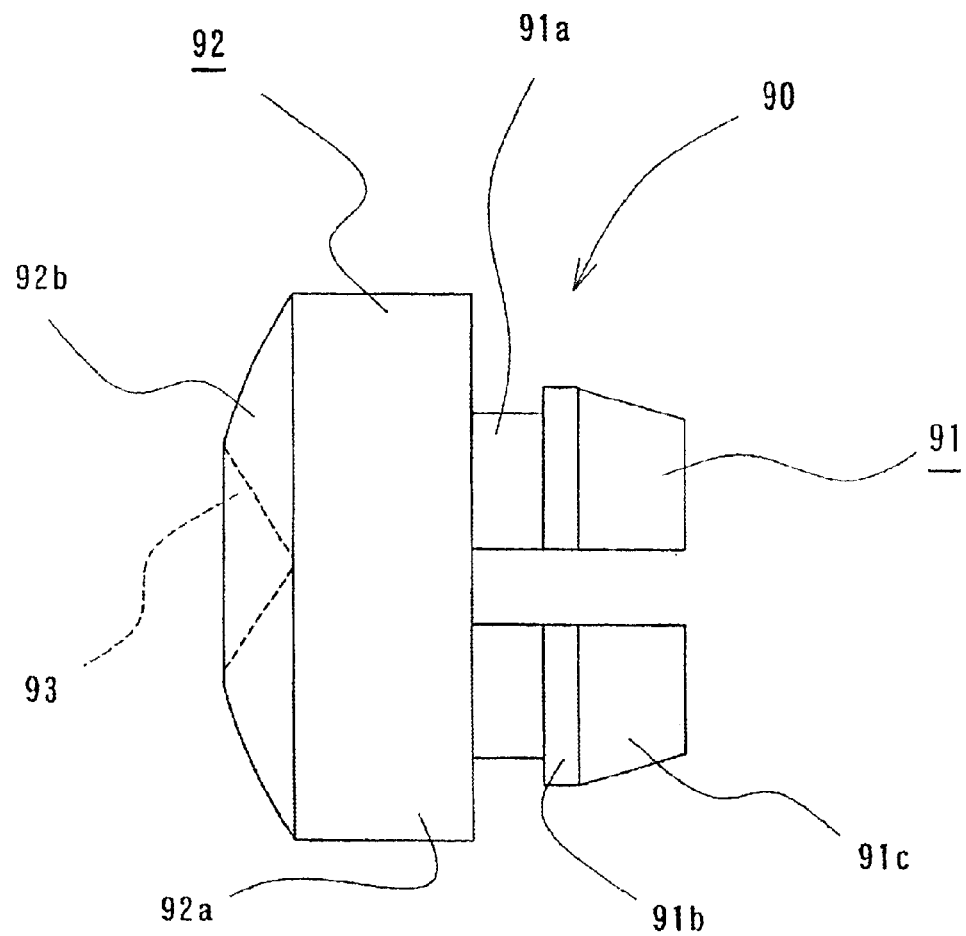
FIG. 21 is a side view showing one of the legs shown by FIG. 20.
Figure 22:
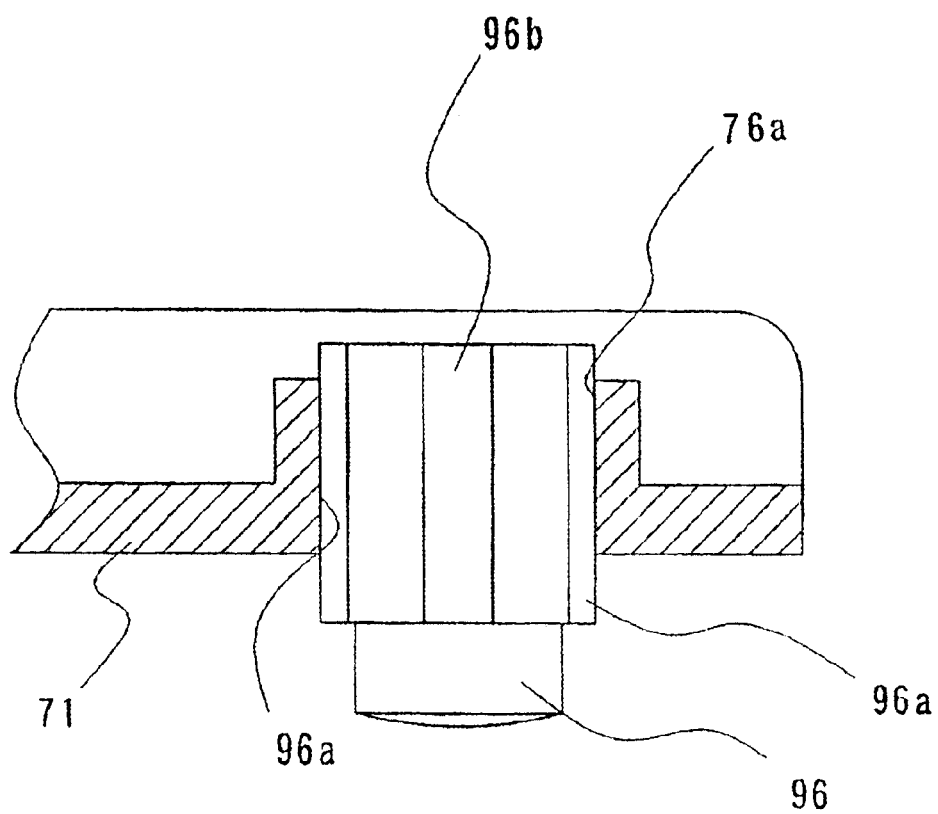
FIG. 22 is a sectional view showing another embodiment of the legs associated with the carriage driving mechanism to support the carriage as mounted on the carriage.
Figure 23:
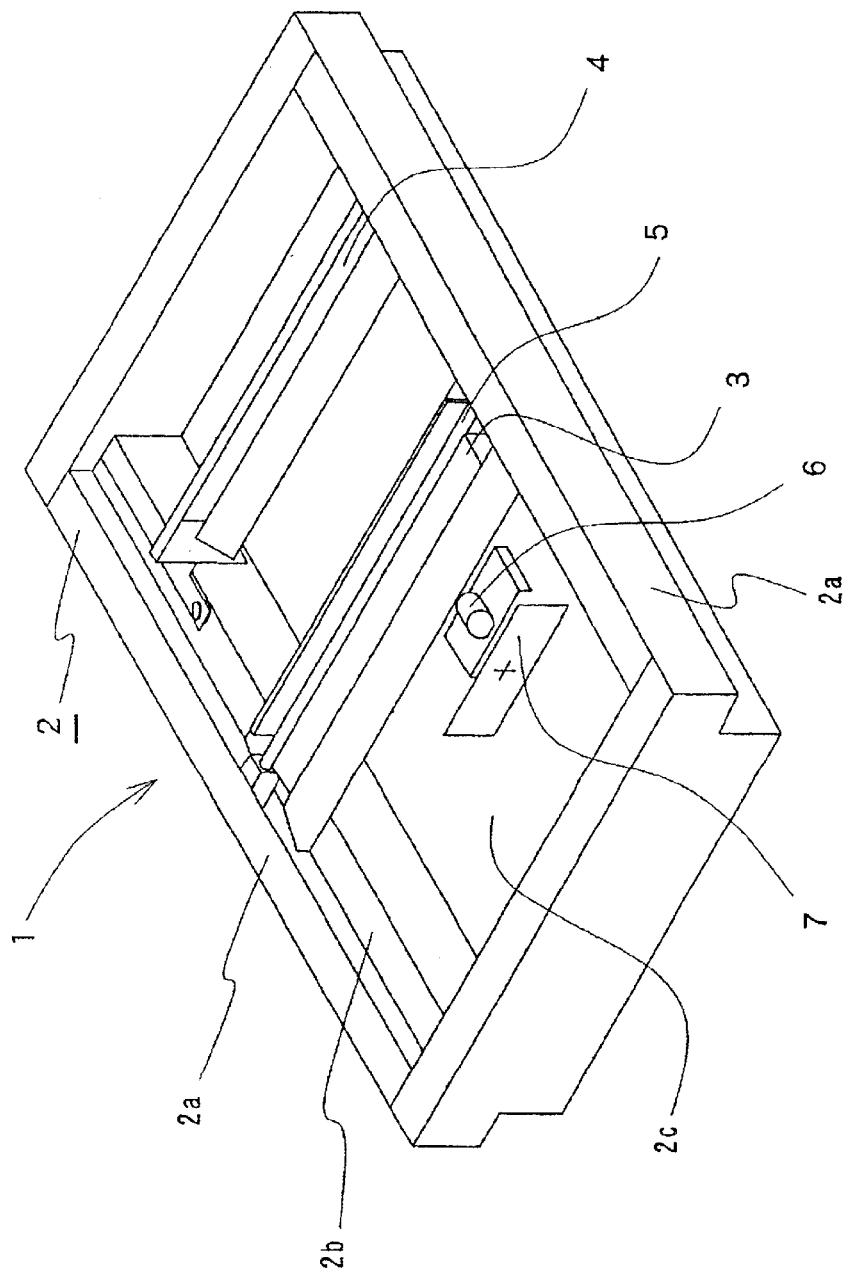
FIG. 23 is a perspective view schematically illustrating the construction of the image processor.
Figure 24:
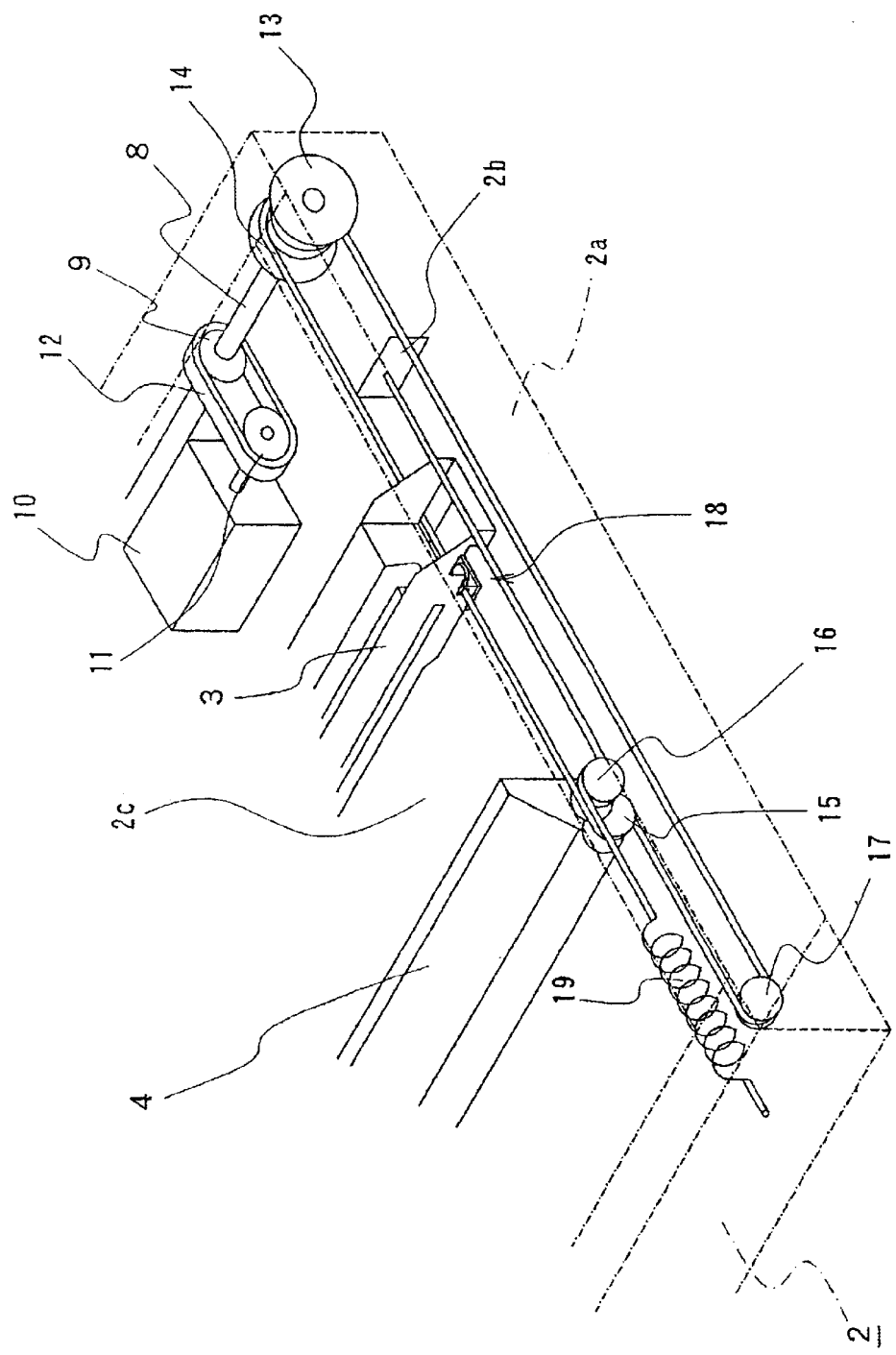
FIG. 24 is a perspective view illustrating the carriage driving mechanism in the image processor.
Figure 25:
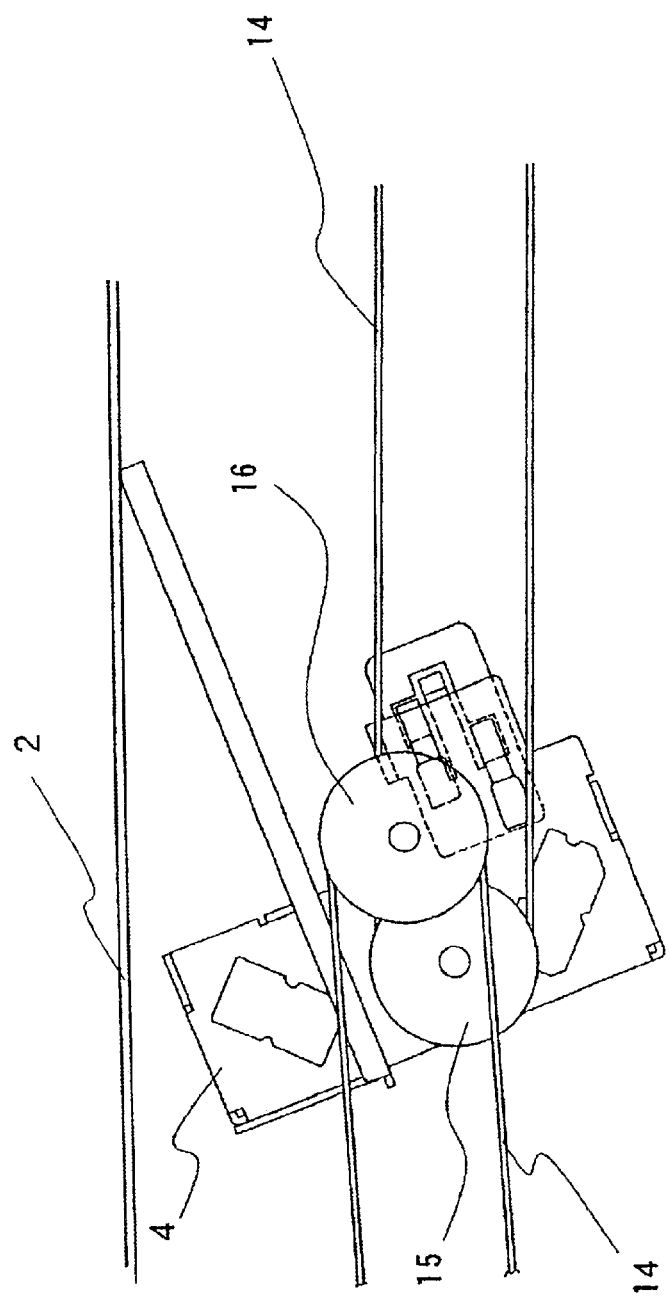
FIG. 25 is a side view of the carriage illustrating a problem left unsolved behind by prior art.

FIGS. 18–22 illustrate the carriage driving mechanism particularly to explain details of the legs as one of the most important features of this carriage driving mechanism. FIGS. 21 and 22 illustrate a specific embodiment of such leg.

Figure 18:
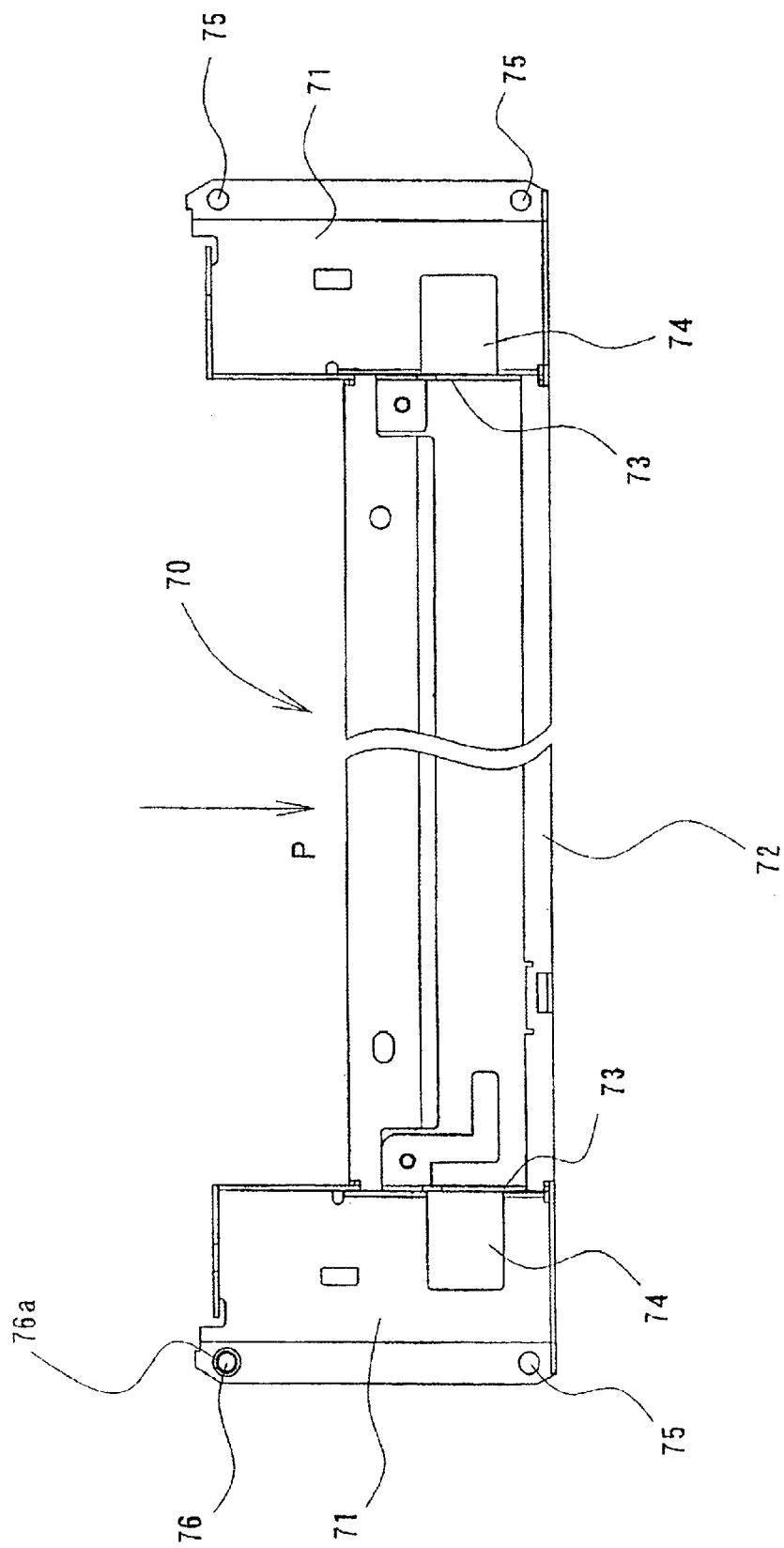
FIG. 18 is a plan view showing an example of the full-rate carriage adapted to be provided with the carriage driving mechanism according to this invention.

FIG. 18 is a plan view showing a full-rate carriage 70 adapted to be provided with the legs of the carriage driving mechanism, in which an arrow P indicates a scanning direction. A carriage body 72 is provided at its longitudinally opposite ends with supporting portions 71 of which the respective edges adjacent said carriage body 72 is provided with walls 73. The wall 73 is, in turn, provided with socket 74 for source lamp in the form of a fluorescent lamp.

In the full-rate carriage 70, said carriage body 72 occupies a location offset to front edges of the respective supporting portions 71 as viewed in the scanning direction so that the supporting portions 71 partially extend from the carriage body 72 rearwardly as viewed in the scanning direction and present a substantially square U-shape in plan view. The first reflector (not shown) is mounted on the carriage body 72. Thus, the full-rate carriage 70 has its center of gravity on the side of the carriage body 72. The circuit including an inverter functioning to drive the fluorescent lamp is mounted on the carriage body 72.

The side edges of said supporting portions 71 remote from the carriage body 72 are formed at corners with holes 75, 76 for mounting the legs, respectively. Of these four holes 75, 76 for mounting the legs, at least one hole 76 more remote from the center of gravity is provided along its inner peripheral surface with female threads 76a so that the height of the leg may be adjusted.

FIG. 19 is a schematic plan view illustrating a half-rate carriage 80 adapted to travel in synchronization with said full-rate carriage 70 in a direction as indicated by an arrow Q by substantially ½ of the range said full-rate carriage 70 travels. This half-rate carriage 80 comprises a carriage body 81 provided with the second and third reflectors (not shown) and supporting portions 82 extending from longitudinally opposite ends of said carriage 81 and placed on the guide tracks 2b of the housing 2. Said carriage body 81 is located rearwardly of the supporting portions 82 as viewed in the scanning direction and therefore said half-rate carriage 80 has its center of gravity on the side of said carriage body 81. The respective supporting portions 82 are formed in the vicinity of their front and rear ends with the holes 83, 84 for mounting the legs. Of these holes 83, 84 for mounting the legs, the holes 84 more remote from the center of gravity are provided along their inner peripheral surfaces with female threads 84a so that the height of the legs may be adjusted.

FIGS. 20 and 21 illustrate a leg 90 to be mounted in said holes 75, 83 for mounting the legs. Obviously, all the legs 90 may be of uniform configuration so far as these holes 75, 83 have a uniform inner diameter, and may be appropriately configured when they have different inner diameters. This leg 90 is molded from suitable synthetic resin such as polyacetal oleoresin or fluorocarbon resin and comprises a shank 91 destined to be inserted into the hole 75, 83 and a foot 92 formed integrally with said shank 91 and having a sole destined to come in contact with said guide track 2b. The shank 91 comprises a neck 91a which is contiguous to the foot 92 and has an outer diameter slightly smaller than the inner diameter of said hole 75, 83, a rim 91b which is contiguous to said neck 91a having an outer diameter substantially larger than that of said neck 91a but slightly larger than the inner diameter of said hole 75, 83 and an insertion guide 91c tapered from said rim 91b toward the forward end. The shank 91 is axially split from its longitudinally middle level into several divisions adapted to be appropriately flexural under their own elasticity. The forward end of said insertion guide 91c has an outer diameter sufficiently smaller than the inner diameter of the hole 75, 83 to be easily inserted into the hole 75, 83.

Foot 92 comprises a cylindrical portion 92a having an outer diameter appropriately larger than the inner diameter of said hole 75, 83 and the sole 92b defined by a portion of a spherical surface. Foot 92 is formed on its surface with a depression of an appropriate depth serving as an oil sump 93 which is preferably formed in a substantially conical shape as shown in FIG. 21 from a viewpoint of workability.

The leg mounted in said hole 76, 84 for adjustment are referred here to as the adjustable leg 96. FIG. 22 is a sectional view illustrating a manner in which said adjustable leg 96 is mounted in said hole 76 for adjustment. The adjustable leg 96 is formed around its peripheral surface with a male thread 96a adapted to be engageable with the female thread 76a formed on the inner peripheral surface of the hole 76 for adjustment. While the outer peripheral surface of the adjustable leg 96 is illustrated to be partially free from said male thread 96a along a part of its entire length, it is not essential to leave such male thread-free portion 96b, i.e., it is possible to form along the entire length of the adjustable leg 96 with the male thread 96a. This adjustable leg 96 is molded from synthetic resin. Particularly, the forward end of this adjustable leg 96 is preferably made of synthetic resin since said forward end is destined to come in direct contact with the guide track 2b of the housing 2 and must be smoothly slidable along said guide track 2b. To meet such requirement, it is also possible to form the portion having the male thread 96a thereon by metallic material and to coat said forward end with suitable synthetic resin. It is possible to form said forward end additionally with said oil sump 93.

The legs in the carriage driving mechanism according to the embodiments as have been described above operate in manners as will be described. First, the legs 90 are inserted from the distal ends of said insertion guides 91c into said holes 75 of the full-rate carriage 70. Said shanks 91 are elastically bent appropriately to be inserted into the holes 75 and restore their initial positions as soon as said rims 91b enter into said holes 75. Once said necks 91a have gone into said holes 75, it is ensured that these legs 90 never fall off from said holes 75. This is true also for mounting of the legs 90 in the holes 83 of said half-rate carriage 80.

Each of the supporting portions is formed at three locations with said holes 75 in which three legs are mounted, respectively. While these legs serve to place the full-rate carriage 70 on the guide tracks with an adequate stability, such stability may be deteriorated as this full-rate carriage 70 travels for scanning. To compensate this, said adjustable leg 96 is mounted on the full-rate carriage 70.

The adjustable leg 96 is adapted to be mounted on the full-rate carriage 70 by screwing this adjustable leg 96 into said hole 76 for adjustment 76. More specifically, the adjustable leg 96 is screwed into the hole 76 for adjustment and said adjustable leg 96 is rotated using a suitable tool. This rotation screws the adjustable leg 96 forward into the hole 76 for adjustment and simultaneously said male thread-free portion 96b is cut by the female thread 76a of the hole 76 for adjustment so as to form a male thread in continuity of said male thread 96a. In this way, a length by which said adjustable leg 96 extends from the supporting portion 71 and thereby a height of said leg 96 can be adjusted. The height of this adjustable leg 96 may be adjusted substantially to the height of the other three legs to support the full-rate carriage 70 on the guide tracks with a desired flatness ensured by these four legs including said adjustable leg 96. Consequently, the full-rate carriage 70 can be moved with a high stability for scanning.

The legs 90 are mounted in the holes 83 of said half-rate carriage 80, and the adjustable leg is screwed into said hole 84 for adjustment by engaging the male thread of said adjustable leg with the female thread 84a of said hole 84 for adjustment in the similar manner as has been described with respect to the full-rate carriage 70. A height of the leg may be adjusted by varying a position at which said leg and said hole 84 are in engagement with each other in order to adjust the leveling of said half-rate carriage 80. If the nominal diameters of the female threads 76a, 84a formed on the inner peripheral wall of these holes 76, 84 both for adjustment are same, the adjustable legs 96 of a same dimension may be used for both the full-rate carriage 70 and the half-rate carriage 80. Otherwise, the adjustable legs 96 should be differently configured and dimensioned in association with the full-rate carriage 70 and the half-rate carriage 80, respectively.

Said oil sump 93 is filled with suitable lubricant such as grease and said sole 92b is also appropriately coated with said lubricant.

Said soles 92b of the legs 90 come in contact with the guide tracks 2b as the respective carriages 70, 80 provided with said legs 90 and having their oil sumps 93 filled with lubricant are placed on said guide tracks 2b. Said soles 92b of the respective legs 90 slide on the surface of said guide tracks 2b as said carriages 70, 80 travel along said guide tracks 2b. Lubricant coating the soles 92b forms oil film between said soles 92b and said guide tracks 2b so that the carriages 70, 80 can smoothly travel along the guide tracks 2b. In response to decrease of said lubricant as the image processor is operated for a long period, said oil sumps 93 supplement fresh lubricant to form new oil film. Accordingly, the carriages can be smoothly moved without generation of noise even if the image processor is operated for a relatively long period.

While the embodiments of this invention have been described in which each of the supporting portions is provided with a single adjustable leg, it is possible without departing from the scope and spirit of this invention to implement two or more, or even all of the legs in the form of the adjustable legs.

As will be apparent from the foregoing description, the novel carriage driving mechanism for the image processor can avoid an apprehension that the carriages might float off from the guide tracks during transport or scanning operation of the image processor due to an unexpected force exerted on the carriages. This is owing to the tilt preventing means provided on the carriages at appropriate locations. Even if said unexpected force is exerted on the carriages, the carriages can rapidly and reliably restore their normal positions for scanning without any apprehension that the carriages might remain in tilted positions.

The arrangement that said tilt preventing means come in contact or engagement with the top plate of the housing or the wire allows said tilt preventing means to be mounted on the existing housing without demand for alteration of the housing's construction.

Furthermore, the tilt preventing means are provided in the form of the bumper brackets so that they can be mounted on the existing image processor.

The soles of the respective legs destined to come in contact with the guide tracks are formed with the oil sumps filled with lubricant so that, in response to decrease of said lubricant as the image processor is operated for a long period, said oil sumps supplement fresh lubricant to form new oil film. Accordingly, the carriages can be smoothly moved without generation of noise even if the image processor is operated for a relatively long period. It is also avoided that the carriages might jump up during their operation.

Said oil sumps are conically shaped so that they can be easily molded integrally with the legs from material such as synthetic resin or the like.

Said oil sumps may be preferably filled with grease, which has a relatively high viscosity and therefore does not easily drain out from the oil sumps.

At least one of four legs supporting the carriage is implemented in the form of the height adjustable leg so that, after the carriage has been supported by the remaining three legs with a desired flatness, said one leg may be height-adjustably mounted on the supporting portion to maintain said desired flatness with which the carriage is supported. This flatness can be ensured even during movement of the carriage and therefore the photoelectric converter device having a relatively small flux width can pick up the image information from the original and output an exact image data. The carriages travel with a high stability without any apprehension that they might jump up in the course of travelling.

The height-adjustable leg enables the carriages to be adjusted at the step of assembling the carriages with the housing and said height-adjustable leg can be easily molded with a correspondingly low working precision.

Finally, said height-adjustable leg is mounted on the supporting portion at a location remote from the carriage's center of gravity so that a fine adjustment can be facilitated.

What is claimed is:

1. In an image processor comprising a housing, carriage provided with legs by which said carriage is supported on guide tracks of said housing and a light source lamp mounted on said carriage wherein said carriage is driven to scan an original by irradiating successively different locations of said original with light rays emitted from said light source lamp and thereby to optically pick up image information from said original, a carriage driving mechanism for such image processor characterized by that:

said carriage is provided with tilt preventing means, wherein said tilt preventing means are mounted on the carriage at its appropriate locations so that said tilt preventing means come in engagement with a predetermined length of wire serving to drive said carriage and thereby prevent said carriage from tilting even if said carriage tends to tilt.

2. The carriage driving mechanism for the image processor according to claim 1, wherein the carriage is formed with supporting arms extending from said carriage in the scanning direction and said supporting arms are provided on their forward ends with contact pins laterally extending from said forward ends so that said contact pins come in contact with said wire to prevent said carriage from tilting.

3. The carriage driving mechanism for the image processor according to claim 2, wherein said legs are formed on their surfaces destined to come in contact with the guide tracks with depressions serving as oil sumps and these oil sumps are filled with lubricant.

4. The carriage driving mechanism for the image processor according to claim 2, wherein said carriage is provided with four legs serving to support said carriage of which at least one is inserted into a through-hole formed in said carriage so that an insertion length of this one leg may be adjusted to adjust a height of this one leg in its mounted state.

5. The carriage driving mechanism for the image processor according to claim 1, wherein said tilt preventing means are provided in the form of brackets detachably attached to the carriage so that said brackets come in contact with appropriate locations of the housing or with said wire and thereby prevent said carriage from tilting.

6. The carriage driving mechanism for the image processor according to claim 1, wherein said legs are formed on their surfaces destined to come in contact with the guide tracks with depressions serving as oil sumps and these oil sumps are filled with lubricant.

7. The carriage driving mechanism for the image processor according to claim 1, wherein said carriage is provided with four legs serving to support said carriage of which at least one is inserted into a through-hole formed in said carriage so that an insertion length of this one leg may be adjusted to adjust a height of this one leg in its mounted state.

8. In an image processor comprising a housing, carriage provided with legs by which said carriage is supported on guide tracks of said housing and a light source lamp mounted on said carriage wherein said carriage is driven to scan an original by irradiating successively different locations of said original with light rays emitted from said light source lamp and thereby to optically pick up image information from said original, a carriage driving mechanism for such image processor characterized by that:

said carriage is provided with tilt preventing means mounted on the carriage at its appropriate locations so that said tilt preventing means come in contact or engagement with appropriate locations of said housing and thereby prevent said carriage from tilting even if said carriage tends to tilt and wherein said tilt preventing means are provided in the form of contact arms extending upward from transversely opposite ends of said carriage so that said contact arms come in contact with a top plate of said housing and thereby prevent said carriage from tilting.

9. The carriage driving mechanism for the image processor according to claim 8, wherein said legs are formed on their surfaces destined to come in contact with the guide tracks with depressions serving as oil sumps and these oil sumps are filled with lubricant.

10. The carriage driving mechanism for the image processor according to claim 8, wherein said carriage is provided with four legs serving to support said carriage of which at least one is inserted into a through-hole formed in said carriage so that an insertion length of this one leg may be adjusted to adjust a height of this one leg in its mounted state.

11. In an image processor comprising a housing, carriage provided with legs by which said carriage is supported on guide tracks of said housing and a light source lamp mounted on said carriage wherein said carriage is driven to scan an original by irradiating successively different locations of said original with light rays emitted from said light source lamp and thereby to optically pick up image information from said original, a carriage driving mechanism for such image processor characterized by that:

said carriage is provided with tilt preventing means mounted on the carriage at its appropriate locations so that said tilt preventing means come in contact or engagement with appropriate locations of said housing and thereby prevent said carriage from tilting even if said carriage tends to tilt and wherein said tilt preventing means are provided in the form of contact lugs extending upward from an upper end of said carriage so that said contact lugs come in contact with the top plate of the housing and thereby prevent said carriage from tilting.

12. The carriage driving mechanism for the image processor according to claim 11, wherein said carriage is provided with four legs serving to support said carriage of which at least one is inserted into a through-hole formed in said carriage so that an insertion length of this one leg may be adjusted to adjust a height of this one leg in its mounted state.

13. In an image processor comprising a housing, carriage provided with legs by which said carriage is supported on guide tracks of said housing and a light source lamp mounted on said carriage wherein said carriage is driven by a wire to scan an original by irradiating successively different locations of said original with light rays emitted from said light source lamp and thereby to optically pick up image information from said original, a carriage driving mechanism for such image processor characterized by that:

said carriage is provided with tilt preventing means mounted on the carriage at its appropriate locations so that said tilt preventing means come in contact or engagement with appropriate locations of said housing and thereby prevent said carriage from tilting even if said carriage tends to tilt and wherein said tilt preventing means are provided in the form of brackets detachably attached to the carriage so that said brackets come in contact with appropriate locations of the housing or with said wire and thereby prevent said carriage from tilting.

14. The carriage driving mechanism for the image processor according to claim 13, wherein said legs are formed on their surfaces destined to come in contact with the guide tracks with depressions serving as oil sumps and these oil sumps are filled with lubricant.

15. The carriage driving mechanism for the image processor according to claim 13, wherein said carriage is provided with four legs serving to support said carriage of which at least one is inserted into a through-hole formed in said carriage so that an insertion length of this one leg may be adjusted to adjust a height of this one leg in its mounted state.

16. In an image processor comprising a housing, carriage provided with legs by which said carriage is sup ported on guide tracks of said housing and a light source lamp mounted on said carriage wherein said carriage is driven to scan an original by irradiating successively different locations of said original with light rays emitted from said light source lamp and thereby to optically pick up image information from said original, a carriage driving mechanism for such image processor characterized by that:

said carriage is provided with tilt preventing means to prevent said carriage from tilting even if said carriage tends to tilt and wherein said legs are formed on their surfaces destined to come in contact with the guide tracks with depressions serving as oil sumps and these oil sumps are filled with lubricant.

17. The carriage driving mechanism for the image processor according to claim 16, wherein said carriage is provided with four legs serving to support said carriage of which at least one is inserted into a through-hole formed in said carriage so that an insertion length of this one leg may be adjusted to adjust a height of this one leg in its mounted state.

18. In an image processor comprising a housing, carriage provided with legs by which said carriage is supported on guide tracks of said housing and a light source lamp mounted on said carriage wherein said carriage is driven to scan an original by irradiating successively different locations of said original with light rays emitted from said light source lamp and thereby to optically pick up image information from said original, a carriage driving mechanism for such image processor characterized by that:

said carriage is provided with tilt preventing means mounted on the carriage at its appropriate locations so that said tilt preventing means come in contact or engagement with appropriate locations of said housing and thereby prevent said carriage from tilting even if said carriage tends to tilt and wherein said legs are formed on their surfaces destined to come in contact with the guide tracks with depressions serving as oil sumps and these oil sumps are filled with lubricant.

19. In an image processor comprising a housing, carriage provided with legs by which said carriage is supported on guide tracks of said housing and a light source lamp mounted on said carriage wherein said carriage is driven to scan an original by irradiating successively different locations of said original with light rays emitted from said light source lamp and thereby to optically pick up image information from said original, a carriage driving mechanism for such image processor characterized by that:

said carriage is provided with tilt preventing means mounted on the carriage at its appropriate locations so that said tilt preventing means come in contact or engagement with appropriate locations of said housing and thereby prevent said carriage from tilting even if said carriage tends to tilt, wherein said tilt preventing means are provided in the form of contact lugs extending laterally from the transversely opposite ends of said carriage so that said contact lugs come in contact with lower surfaces of the guide tracks supporting said carriage and thereby prevent said carriage from tilting, and wherein said legs are formed on their surfaces destined to come in contact with the guide tracks with depressions serving as oil sumps and these oil sumps are filled with lubricant.

20. In an image processor comprising a housing, carriage provided with legs by which said carriage is supported on guide tracks of said housing and a light source lamp mounted on said carriage wherein said carriage is driven to scan an original by irradiating successively different locations of said original with light rays emitted from said light source lamp and thereby to optically pick up image information from said original, a carriage driving mechanism for such image processor characterized by that:

said carriage is provided with tilt preventing means mounted on the carriage at its appropriate locations so that said tilt preventing means come in contact or engagement with appropriate locations of said housing and thereby prevent said carriage from tilting even if said carriage tends to tilt, wherein said tilt preventing means are provided in the form of contact lugs extending upward from an upper end of said carriage so that said contact lugs come in contact with the top plate of the housing and thereby prevent said carriage from tilting, and wherein said legs are formed on their surfaces destined to come in contact with the guide tracks with depressions serving as oil sumps and these oil sumps are filled with lubricant.

21. In an image processor comprising a housing, carriage provided with legs by which said carriage is supported on guide tracks of said housing and a light source lamp mounted on said carriage wherein said carriage is driven to scan an original by irradiating successively different locations of said original with light rays emitted from said light source lamp and thereby to optically pick up image information from said original, a carriage driving mechanism for such image processor characterized by that:

said legs are formed on their surfaces destined to come in contact with the guide tracks with depressions serving as oil sump and these oil sumps are filled with lubricant.

22. The carriage driving mechanism for the image processor according to claim 21, wherein said oil sumps present substantially conical shapes.

23. The carriage driving mechanism for the image processor according to claim 22, wherein said lubricant is grease.

24. In an image processor comprising a housing, carriage provided with legs by which said carriage is supported on guide tracks of said housing and a light source lamp mounted on said carriage wherein said carriage is driven to scan an original by irradiating successively different locations of said original with light rays emitted from said light source lamp and thereby to optically pick up image information from said original, a carriage driving mechanism for such image processor characterized by that:

said carriage is provided with tilt preventing means to prevent said carriage from tilting even if said carriage tends to tilt and wherein said carriage is provided with four legs serving to support said carriage of which at least one is implemented in the form of a height-adjustable leg.

25. In an image processor comprising a housing, carriage provided with legs by which said carriage is supported on guide tracks of said housing and a light source lamp mounted on said carriage wherein said carriage is driven to scan an original by irradiating successively different locations of said original with light rays emitted from said light source lamp and thereby to optically pick up image information from said original, a carriage driving mechanism for such image processor characterized by that:

said carriage is provided with tilt preventing means to prevent said carriage from tilting even if said carriage tends to tilt and wherein said carriage is provided with four legs serving to support said carriage of which at least one is inserted into a through-hole formed in said carriage so that an insertion length of this one leg may be adjusted to adjust a height of this one leg in its mounted state.

26. In an image processor comprising a housing, carriage provided with legs by which said carriage is supported on guide tracks of said housing and a light source lamp mounted on said carriage wherein said carriage is driven to scan an original by irradiating successively different locations of said original with light rays emitted from said light source lamp and thereby to optically pick up image information from said original, a carriage driving mechanism for such image processor characterized by that:

said carriage is provided with tilt preventing means mounted on the carriage at its appropriate locations so that said tilt preventing means come in contact or engagement with appropriate locations of said housing and thereby prevent said carriage from tilting even if said carriage tends to tilt and wherein said carriage is provided with four legs serving to support said carriage of which at least one is inserted into a through-hole formed in said carriage so that an insertion length of this one leg may be adjusted to adjust a height of this one leg in its mounted state.

27. In an image processor comprising a housing, carriage provided with legs by which said carriage is supported on guide tracks of said housing and a light source lamp mounted on said carriage wherein said carriage is driven to scan an original by irradiating successively different locations of said original with light rays emitted from said light source lamp and thereby to optically pick up image information from said original, a carriage driving mechanism for such image processor characterized by that:

said carriage is provided with tilt preventing means mounted on the carriage at its appropriate locations so that said tilt preventing means come in contact or engagement with appropriate locations of said housing and thereby prevent said carriage from tilting even if said carriage tends to tilt, wherein said tilt preventing means are provided in the form of contact lugs extending laterally from the transversely opposite ends of said carriage so that said contact lugs come in contact with lower surfaces of the guide tracks supporting said carriage and thereby prevent said carriage from tilting and wherein said carriage is provided with four legs serving to support said carriage of which at least one is inserted into a through-hole formed in said carriage so that an insertion length of this one leg may be adjusted to adjust a height of this one leg in its mounted state.

28. In an image processor comprising a housing, carriage provided with legs by which said carriage is supported on guide tracks of said housing and a light source lamp mounted on said carriage wherein said carriage is driven to scan an original by irradiating successively different locations of said original with light rays emitted from said light source lamp and thereby to optically pick up image information from said original, a carriage driving mechanism for such image processor characterized by that:

at least one of said legs is implemented in the form of a height-adjustable leg.

29. The carriage driving mechanism for the image processor according to claim 28, wherein the height-adjustable leg is mounted on the carriage at a location most remote from the carriage's center of gravity.

30. In an image processor comprising a housing, carriage provided with legs by which said carriage is supported on guide tracks of said housing and a light source lamp mounted on said carriage wherein said carriage is driven to scan an original by irradiating successively different locations of said original with light rays emitted from said light source lamp and thereby to optically pick up image information from said original, a carriage driving mechanism for such image processor characterized by that:

at least one of said legs is inserted into a through-hole formed in said carriage and an insertion length of this one leg is adjusted to adjust the height of this one leg when mounted.

31. The carriage driving mechanism for the image processor according to claim 30, wherein said through-hole is formed with a female thread while said one leg is formed with a male thread so that a height of said one leg can be adjusted.

* * * * *